(12) United States Patent
Pandit et al.

(10) Patent No.: US 8,238,439 B2
(45) Date of Patent: Aug. 7, 2012

(54) METHODS AND APPARATUS FOR MULTI-VIEW INFORMATION CONVEYED IN HIGH LEVEL SYNTAX

(75) Inventors: Purvin Bibhas Pandit, Franklin Park, NJ (US); Peng Yin, West Windsor, NJ (US); Yeping Su, Camas, WA (US)

(73) Assignee: Thomson Licensing, Boulogne-Billancourt (FR)

( * ) Notice: Subject to any disclaimer, the term of this patent is extended or adjusted under 35 U.S.C. 154(b) by 424 days.

(21) Appl. No.: 12/448,480

(22) PCT Filed: Jan. 4, 2008

(86) PCT No.: PCT/US2008/000112
§ 371 (c)(1),
(2), (4) Date: Jun. 22, 2009

(87) PCT Pub. No.: WO2008/085885
PCT Pub. Date: Jul. 17, 2008

(65) Prior Publication Data
US 2010/0020884 A1   Jan. 28, 2010

Related U.S. Application Data

(60) Provisional application No. 60/883,464, filed on Jan. 4, 2007.

(51) Int. Cl.
| H04N 7/12 | (2006.01) |
| H04N 11/02 | (2006.01) |
| H04N 11/04 | (2006.01) |
| H04N 7/00 | (2011.01) |

(52) U.S. Cl. .................................. 375/240.25; 348/461
(58) Field of Classification Search .................. None
See application file for complete search history.

(56) References Cited

U.S. PATENT DOCUMENTS

| 6,055,012 | A  * | 4/2000 | Haskell et al. ................ 348/48 |
| 2007/0147502 | A1 * | 6/2007 | Nakamura .............. 375/240.12 |
| 2007/0177813 | A1 * | 8/2007 | Yang ............................ 382/233 |
| 2008/0043096 | A1 * | 2/2008 | Vetro et al. ..................... 348/51 |
| 2008/0089596 | A1 * | 4/2008 | Choi et al. .................... 382/238 |
| 2008/0095228 | A1 * | 4/2008 | Hannuksela et al. .... 375/240.01 |

OTHER PUBLICATIONS

"Joint Multiview Video Model 1.0", Joint Video Team of ISO/IEC MPEG & ITU-T VCEG, No. JVT-T208, Jul. 2006, pp. 1-23, XP002464353.

"Requirements on Multi-view Video Coding v.6", International Organisation for Standardisation Organisation Internationale De Normalisation, ISO/IEC JTC1/SC29/WG11; Coding of Moving Pictures and Audio, Apr. 2006, XP030014556.

(Continued)

Primary Examiner — Joseph Ustaris
Assistant Examiner — Kevin McInnish
(74) Attorney, Agent, or Firm — Robert D. Shedd; Paul P. Kiel; Guy H. Eriksen

(57) ABSTRACT

There are provided methods and apparatus for multi-view information conveyed in high level syntax. An encoding method and apparatus is disclosed for encoding multi-view video content in a resultant bitstream and multi-view coding information for the multi-view video content in at least one high level syntax element. A decoding method and apparatus is disclosed for decoding multi-view video content from a resultant bitstream and multi-view coding information for the multi-view content from at least one high level syntax element.

37 Claims, 10 Drawing Sheets

OTHER PUBLICATIONS

Kim, Jae-Hoon, et al..:"Comments on High-Level syntax for MVC", Video Standards and Drafts, No. M13319, Apr. 2006, XP030041988.
Yea et al.:"Report on Core Experiment CE3 of Multiview Coding" Joint Video Team (JVT) of ISO/IEC MPEG & ITU-T VCEG; JVT-T106, Jul. 2006, XP030006610.
Kimata H et al.:"Proposal on a Coding Scheme for Free Viewpoint Scalability", Video Standards and Drafts, No. JVT-T134, Jul. 2006, XP030006621.
Pandit et al.:"MVC High-Level Syntax for Random Access", Video Standards and Draft, No. M13715, Jul. 2006, pp. 1-11; XP030042384.
Xu Xiaozhong, et al.:"MVC Camera Position Parameters Coding", Video Standards and Drafts, No. JVT-T138, Jul. 18, 2006, XP030006625.
Kimata H et al.:"System Design of Free Viewpoint Video Communication" Computer and Information Technology, 2004, CIT '04, Sep. 14, 2004, pp. 52-59, XP010743221.
International Search Report dtd. Jul. 2, 2008.

* cited by examiner

METHODS AND APPARATUS FOR MULTI-VIEW INFORMATION CONVEYED IN HIGH LEVEL SYNTAX

CROSS-REFERENCE TO RELATED APPLICATIONS

This application claims the benefit, under 35 U.S.C. §365 of International Application PCT/US2008/000112 filed Jan. 4, 2008, which was published in accordance with PCT Article 21(2) on Jul. 17, 2008 in English and which claims the benefit of United States provisional patent application No. 60/883,464 filed Jan. 4, 2007.

TECHNICAL FIELD

The present principles relate generally to video encoder and decoding and, more particularly, to methods and apparatus for multi-view information conveyed in high level syntax.

BACKGROUND

A bitstream compliant with the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard") or an extension thereof such as, for example, scalable video coding (SVC) and multi-view video coding (MVC) includes Network Abstraction View (NAL) units. A NAL unit is an atomic element that can be framed for transport and parsed independently. NAL units can be categorized with respect to Video Coding View (VCL) NAL units and non-VCL NAL units. VCL NAL units include syntax elements representing one or more coded macroblocks, each of which corresponding to a block of samples in the uncompressed picture. A non-VCL NAL unit may be of one of the following types: a sequence parameter set (and its extension), a picture parameter set, a supplemental enhancement information (SEI) NAL unit, and so forth. A supplemental enhancement information NAL unit includes one or more supplemental enhancement information messages, which are not required for the decoding of output pictures but assist in related processes such as picture output timing, rendering, error detection, error concealment, resource reservation, and so forth. Although that information can be acquired by analyzing the original bitstream, supplemental enhancement information messages can be used to provide all the required information without actually decoding the bitstream. The system component can directly access the information and this makes the system-level operation much easier.

Up to now, 22 types of supplemental enhancement information messages are specified in the MPEG-4 AVC Standard and 7 additional types of supplemental enhancement information messages are specified in the scalable video coding (SVC) extension of the MPEG-4 AVC Standard. Since the multi-view video coding (MVC) extension of the MPEG-4 AVC Standard is new, there are no supplemental enhancement information messages relating thereto that provide any necessary or desired multi-view video coding information.

SUMMARY

These and other drawbacks and disadvantages of the prior art are addressed by the present principles, which are directed to methods and apparatus for multi-view information conveyed in high level syntax.

According to an aspect of the present principles, there is provided an apparatus. The apparatus includes an encoder for encoding multi-view video content in a resultant bitstream and multi-view coding information for the multi-view video content in at least one high level syntax element.

According to another aspect of the present principles, there is provided a method. The method includes encoding multi-view video content in a resultant bitstream and encoding multi-view coding information for the multi-view content in at least one high level syntax element.

According to yet another aspect of the present principles, there is provided an apparatus. The apparatus includes a decoder for decoding multi-view video content from a resultant bitstream and multi-view coding information for the multi-view content from at least one high level syntax element.

According to still another aspect of the present principles, there is provided a method. The method includes decoding multi-view video content from a resultant bitstream and multi-view coding information for the multi-view content from at least one high level syntax element.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
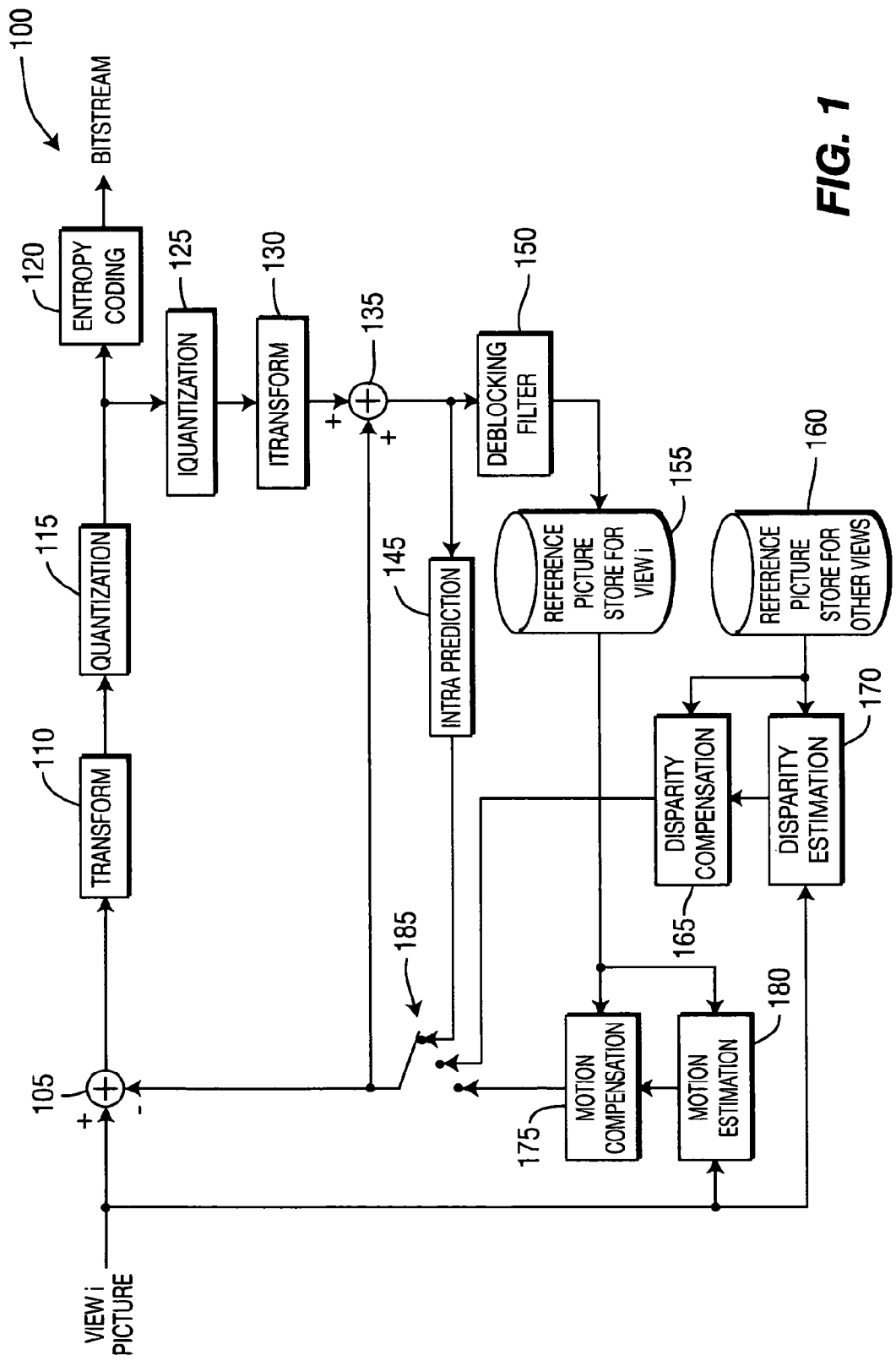
FIG. 1 is a block diagram for an exemplary Multi-view Video Coding (MVC) encoder to which the present principles may be applied, in accordance with an embodiment of the present principles.

The present principles are directed to methods and apparatus for multi-view information conveyed in high level syntax.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

Further, the phrases "read/parse" and "read/parsed" refer to reading or both parsing and reading.

Moreover, it is to be appreciated that while one or more embodiments of the present principles are described herein with respect to the multi-view video coding extension of the MPEG-4 AVC standard, the present principles are not limited to solely this standard and corresponding extension thereof and, thus, may be utilized with respect to other video coding standards, recommendations, and extensions thereof, relating to multi-view video coding, while maintaining the spirit of the present principles.

As used herein, "high level syntax" refers to syntax present in the bitstream that resides hierarchically above the macroblock layer. For example, high level syntax, as used herein, may refer to, but is not limited to, syntax at the slice header level, the sequence parameter set (SPS) level, the picture parameter set (PPS) level, the view parameter set (VPS) level, the network abstraction layer (NAL) unit header level, and in a supplemental enhancement information (SEI) message.

For the sake of illustration and brevity, the following embodiments are described herein with respect to the use of supplemental enhancement information (SEI) messages. However, it is to be appreciated that the present principles are not limited to solely the use of supplemental enhancement information (SEI) messages with respect to conveying multi-view information as disclosed herein and, thus, the conveying of multi-view information may be implemented with respect to at least the above-described types of high level syntaxes including, but not limited to, syntaxes at the slice header level, the sequence parameter set (SPS) level, the picture parameter set (PPS) level, the view parameter set (VPS) level, the network abstraction layer (NAL) unit header level, and in a supplemental enhancement information (SEI) message, while maintaining the spirit of the present principles.

Turning to FIG. 1, an exemplary Multi-view Video Coding (MVC) encoder is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. An output of the deblocking filter 150 is connected in signal communication with an input of a reference picture store 155 (for view i). An output of the reference picture store 155 is connected in signal communication with a first input of a motion compensator 175 and a first input of a motion estimator 180. An output of the motion estimator 180 is connected in signal communication with a second input of the motion compensator 175

An output of a reference picture store 160 (for other views) is connected in signal communication with a first input of a disparity estimator 170 and a first input of a disparity compensator 165. An output of the disparity estimator 170 is connected in signal communication with a second input of the disparity compensator 165.

An output of the entropy decoder 120 is available as an output of the encoder 100. A non-inverting input of the combiner 105 is available as an input of the encoder 100, and is connected in signal communication with a second input of the disparity estimator 170, and a second input of the motion estimator 180. An output of a switch 185 is connected in signal communication with a second non-inverting input of the combiner 135 and with an inverting input of the combiner 105. The switch 185 includes a first input connected in signal communication with an output of the motion compensator 175, a second input connected in signal communication with an output of the disparity compensator 165, and a third input connected in signal communication with an output of the intra predictor 145.

Figure 2:
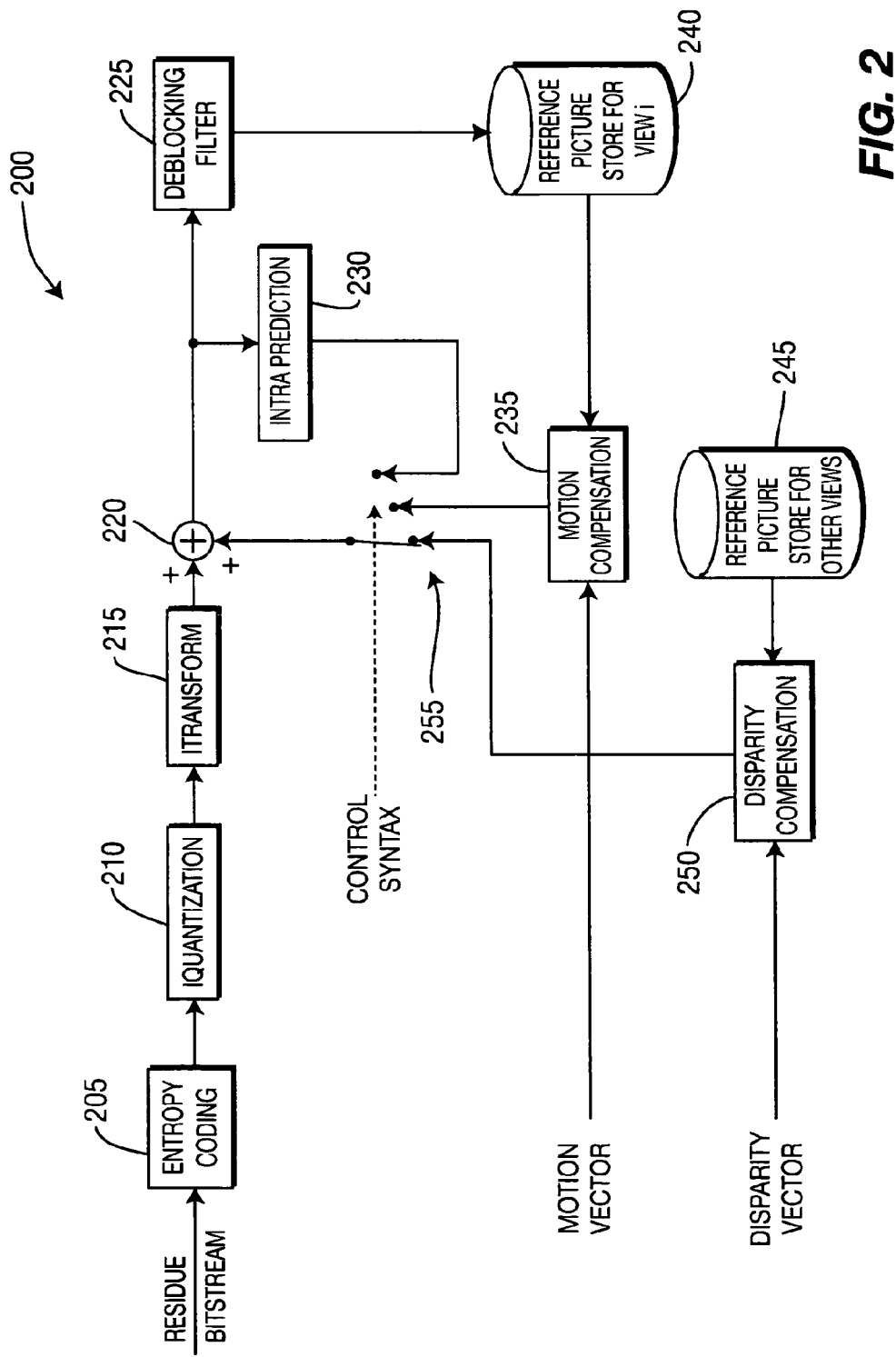
FIG. 2 is a block diagram for an exemplary Multi-view Video Coding (MVC) decoder to which the present principles may be applied, in accordance with an embodiment of the present principles.
Figure 3A:
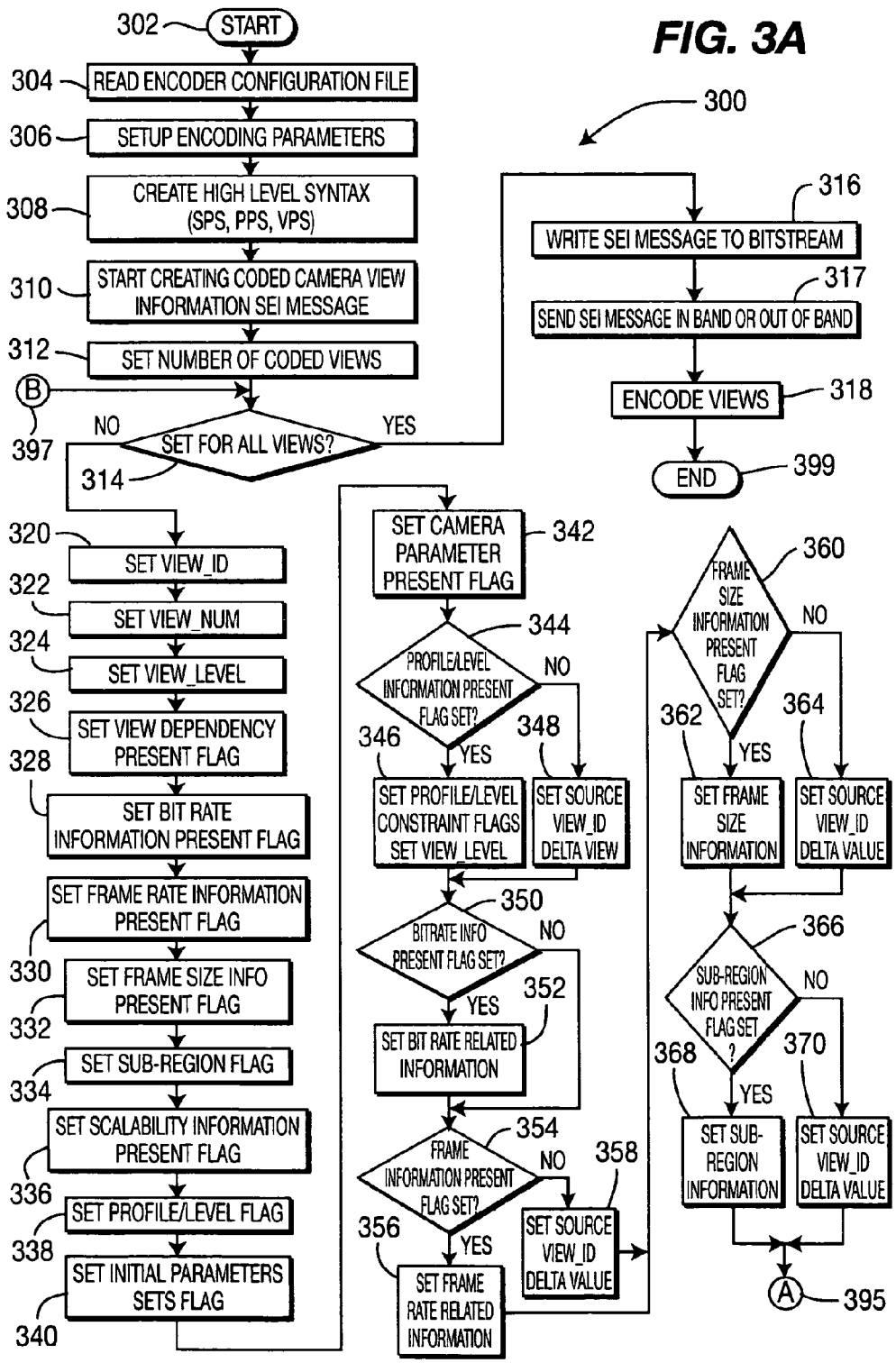
FIGS. 3A-3D are flowcharts for an exemplary method for encoding multi-view information, in accordance with an embodiment of the present principles.
Figure 3B:
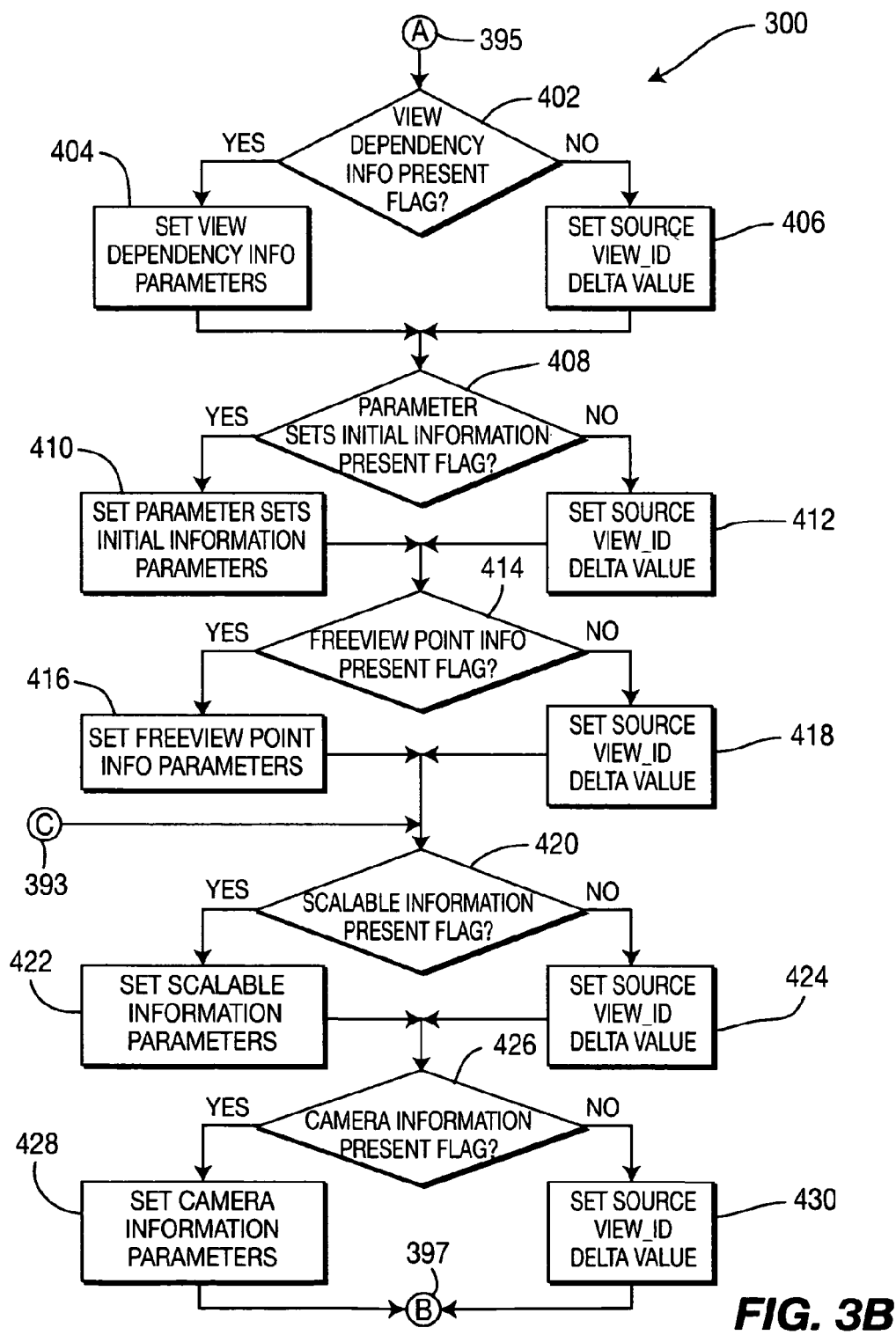
Figure 3C:
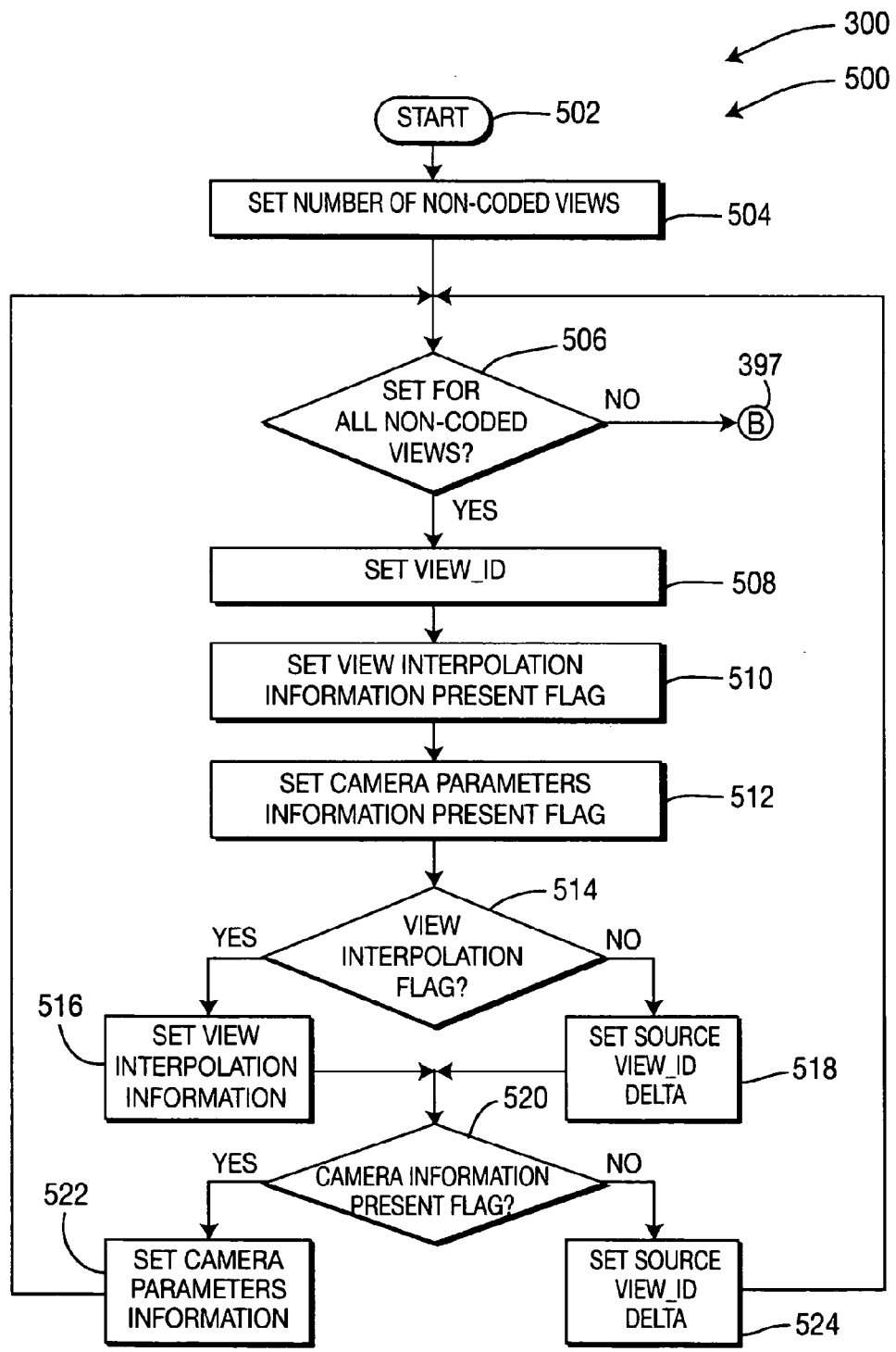
Figure 3D:
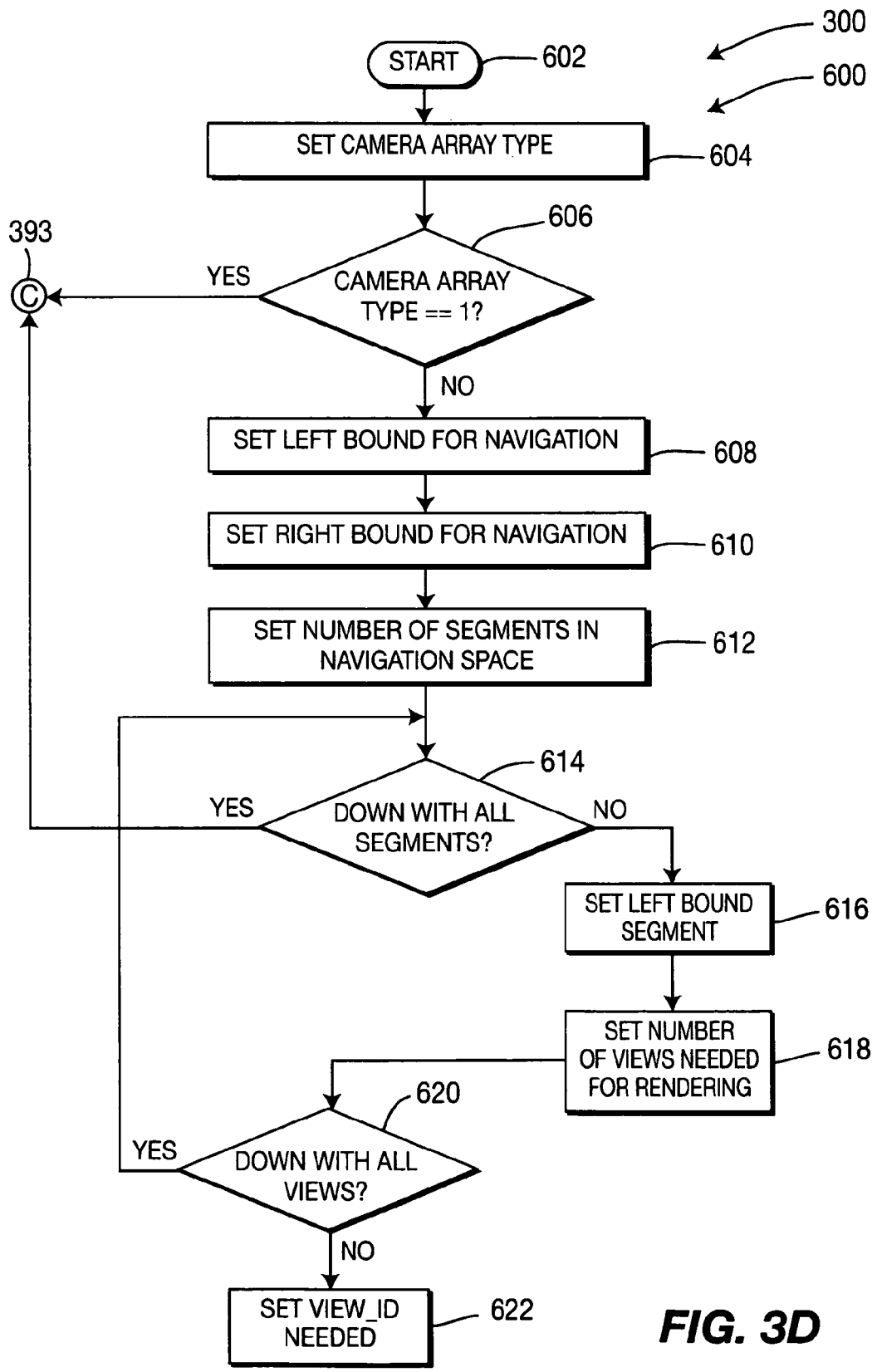
Figure 4A:
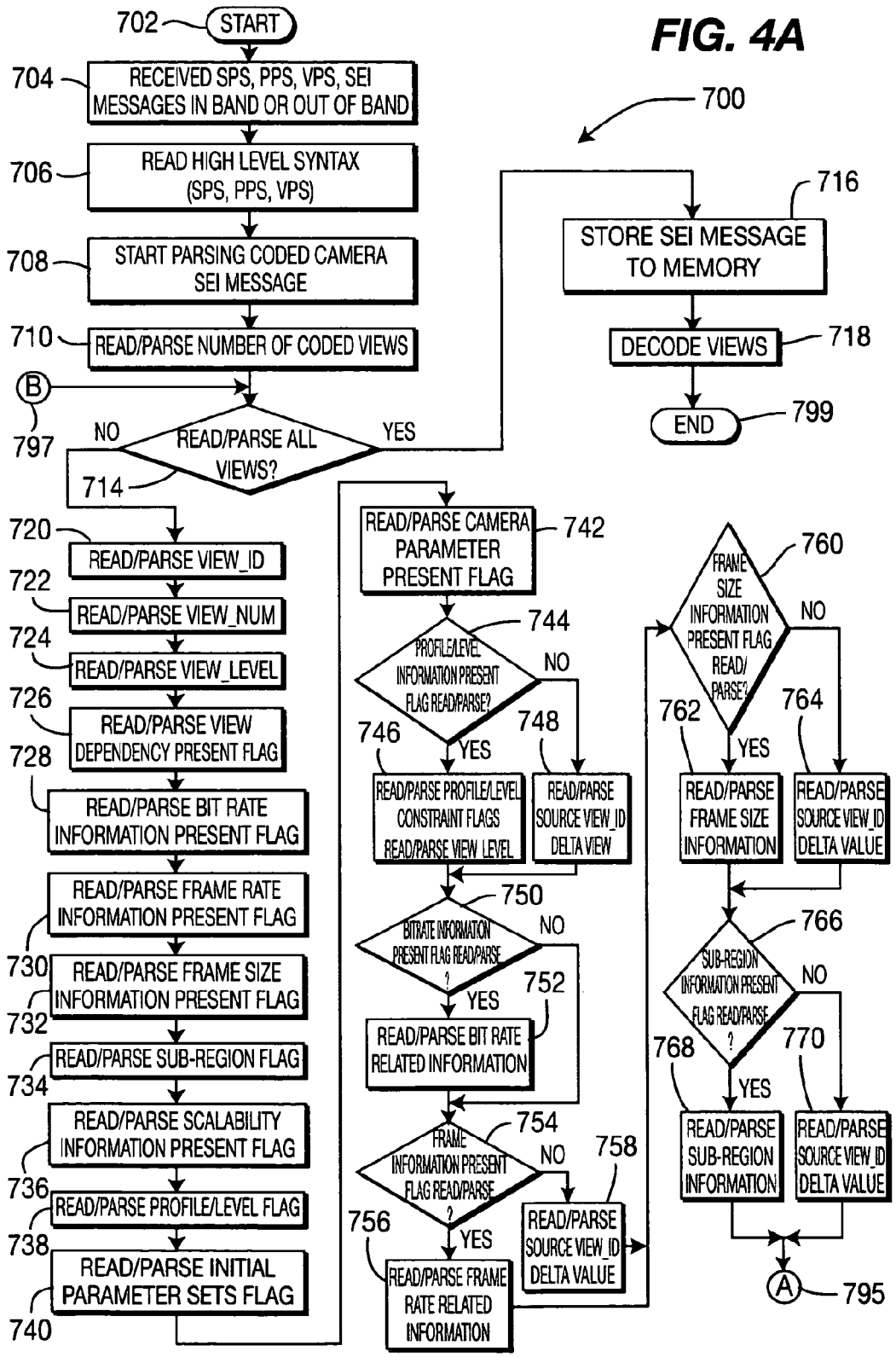
FIGS. 4A-4D are flowcharts for an exemplary method for decoding multi-view information, in accordance with an embodiment of the present principles.
Figure 4B:
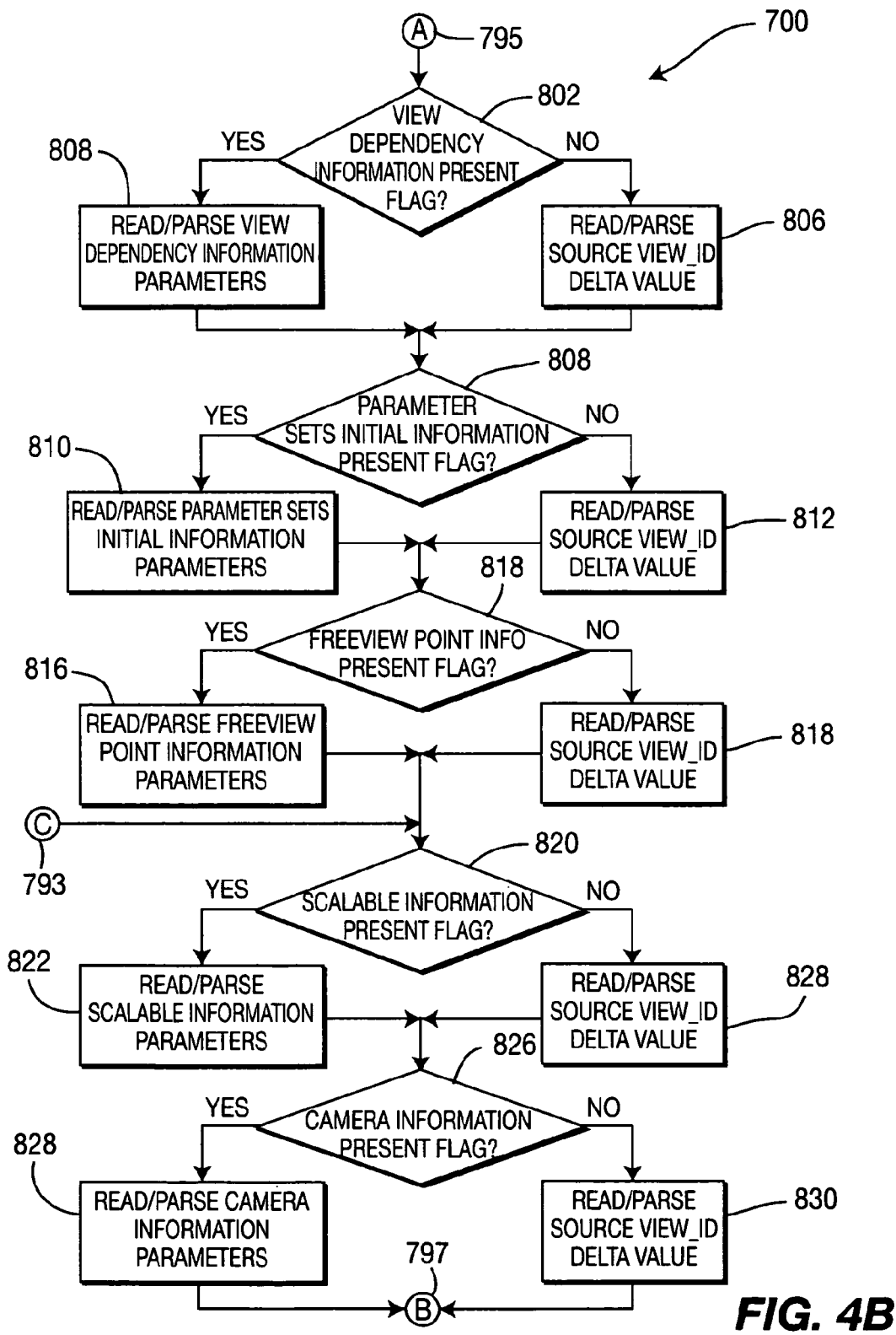
Figure 4C:
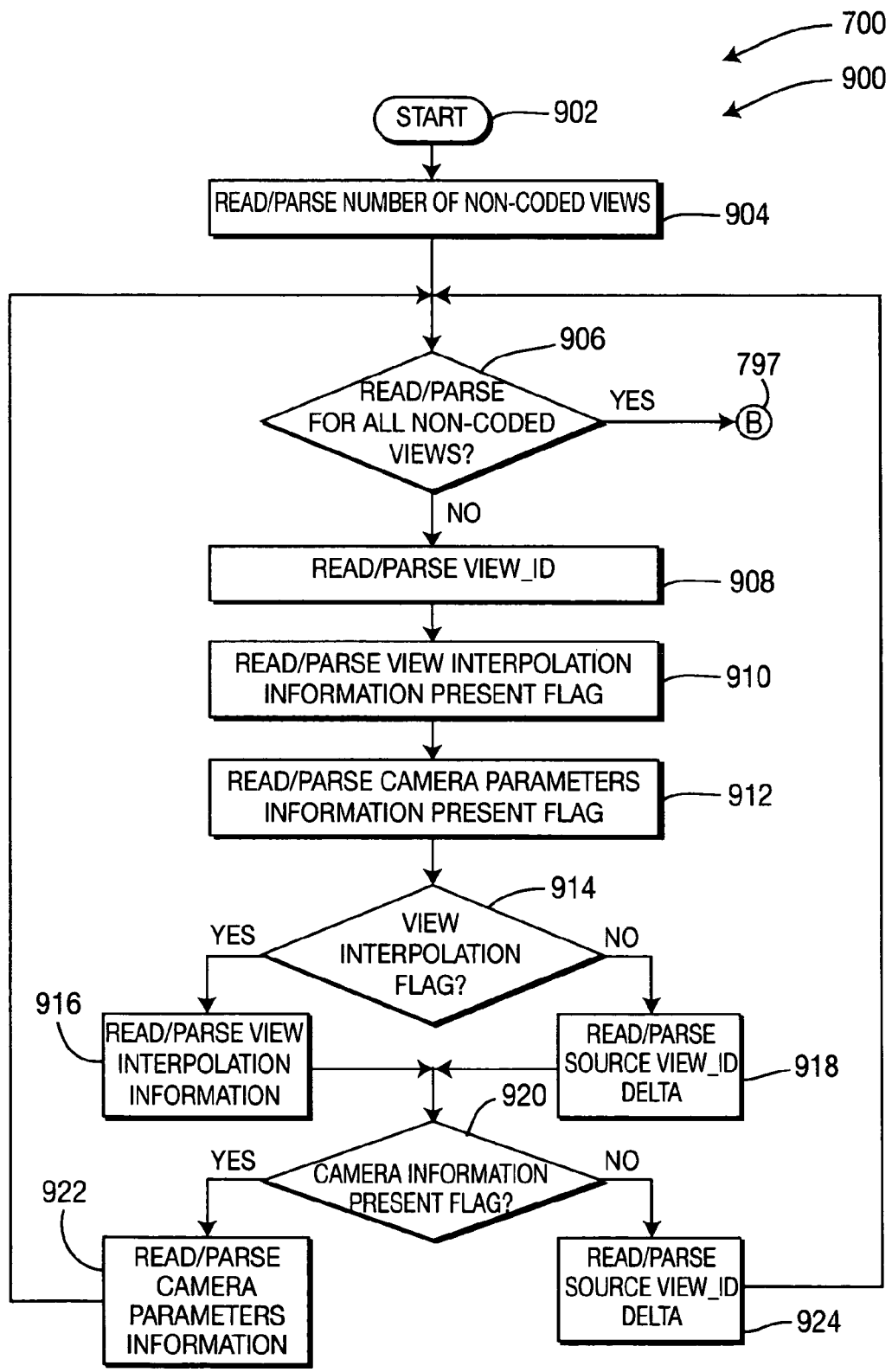
Figure 4D:
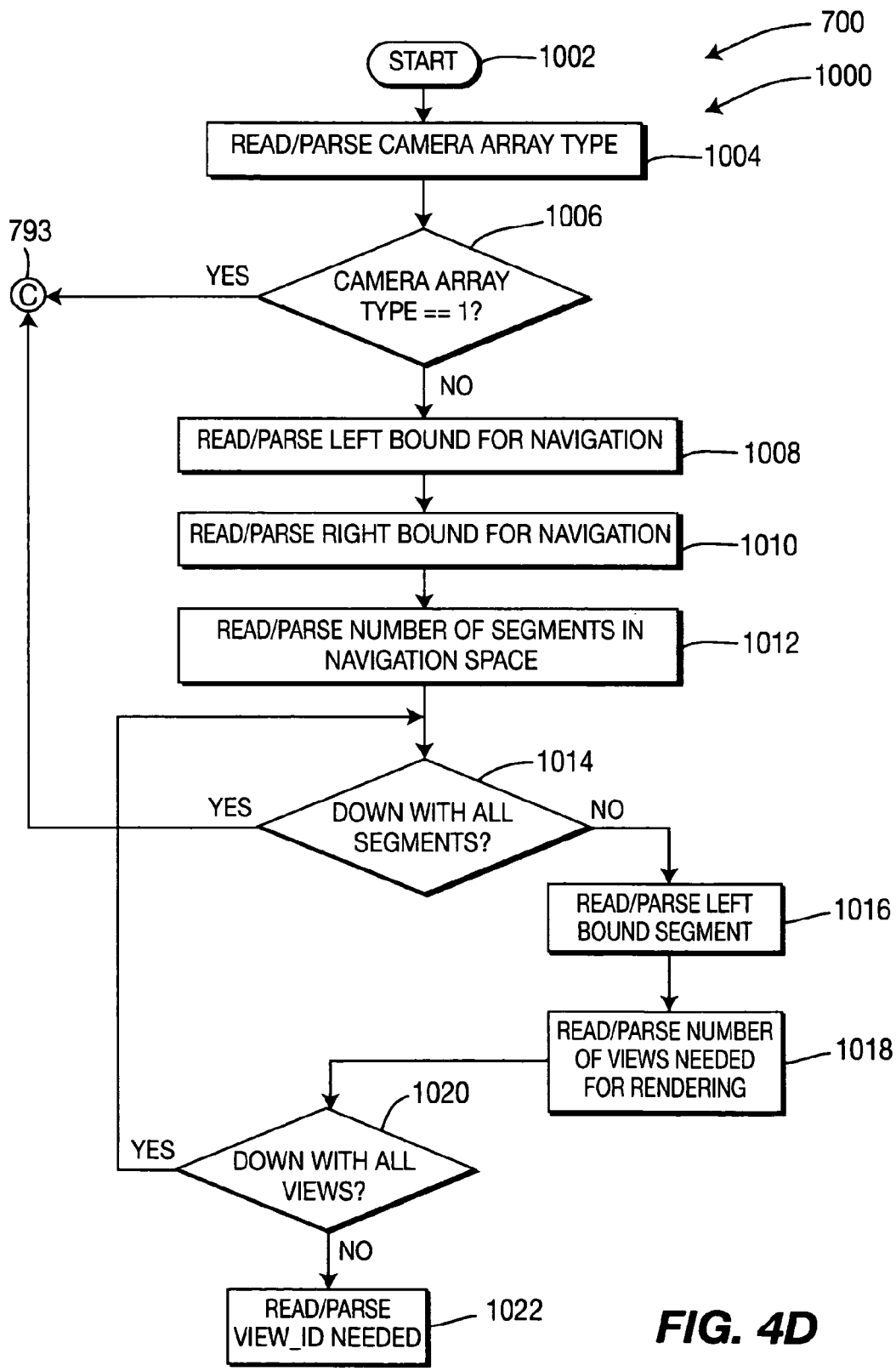

Turning to FIG. 2, an exemplary Multi-view Video Coding (MVC) decoder is indicated generally by the reference numeral 200. The decoder 200 includes an entropy decoder 205 having an output connected in signal communication with an input of an inverse quantizer 210. An output of the inverse quantizer is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225 and an input of an intra predictor 230. An output of the deblocking filter 225 is connected in signal communication with an input of a reference picture store 240 (for view i). An output of the reference picture store 240 is connected in signal communication with a first input of a motion compensator 235.

An output of a reference picture store 245 (for other views) is connected in signal communication with a first input of a disparity compensator 250.

An input of the entropy coder 205 is available as an input to the decoder 200, for receiving a residue bitstream. Moreover, a control input of the switch 255 is also available as an input to the decoder 200, for receiving control syntax to control which input is selected by the switch 255. Further, a second input of the motion compensator 235 is available as an input of the decoder 200, for receiving motion vectors. Also, a second input of the disparity compensator 250 is available as an input to the decoder 200, for receiving disparity vectors.

An output of a switch 255 is connected in signal communication with a second non-inverting input of the combiner 220. A first input of the switch 255 is connected in signal communication with an output of the disparity compensator 250. A second input of the switch 255 is connected in signal communication with an output of the motion compensator 235. A third input of the switch 255 is connected in signal communication with an output of the intra predictor 230. An output of the mode module 260 is connected in signal communication with the switch 255 for controlling which input is selected by the switch 255. An output of the deblocking filter 225 is available as an output of the decoder.

As noted above, the present principles are directed to methods and apparatus for multi-view information conveyed in supplemental enhancement information (SEI) messages. In an embodiment, new Supplemental enhancement information (SEI) messages are provided for signaling of multi-view information in the multi-view video coding (MVC) extension of the MPEG-4 AVC Standard.

The present principles may be applied in various system level operations corresponding to multi-view video streams including, but not limited to, such operations as stream adaptation, data extraction and transmission, random access, error detection, error concealment, and so forth. Although the required information can be obtained by analyzing the original bitstream, such bitstream analysis is non-trivial in terms of both implementation and computational complexity. It is more flexible and helpful if the information is made accessible to system components beyond the video encoder and decoder. Embodiments of the present principles provide such information beyond the encoder and decoder.

In accordance with the present principles, we propose several new supplemental enhancement information messages to provide necessary multi-view video coding (MVC) information. In multi-view video coding, we have some camera views coded, some camera views not coded, and some free views not captured by the camera, but generated from original camera views. In accordance with the present principles, we will describe new supplemental enhancement information messages based on, but not limited to, the following three illustrative categories: (1) coded camera views; (2) non-coded camera views; and (3) generated views for free viewpoint applications. Of course, given the teachings of the present principles provided herein, embodiments of the present principles are not limited solely to these categorizations, and other categorizations and implementations may be readily implemented by one of ordinary skill in this and related arts, while maintaining the spirit of the present principles.

Exemplary types of multi-view video coding information that are relevant and useful in multi-view video communication include, but are not limited to, the following.

With respect to coded camera views, exemplary types of multi-view video coding information include, but are not limited to, the following: the total number of coded views; the characteristics of each coded view; view identifier and its coding order; view scalability information; view dependency information; bit rate; frame size; frame rate; ROI (Region Of Interest) information; scalability information (temporal, spatial and/or signal-to-noise-ration (SNR)); required decoder (e.g., profile, level and profile compatibility information); required initial parameter sets; and camera parameters.

With respect to non-coded camera views, exemplary types of multi-view video coding information include, but are not limited to, the following: the total number of non-coded views; the characteristic of each non-coded view; view identifier; view interpolation information; and camera parameters.

With respect to free viewpoint, exemplary types of multi-view video coding information include, but are not limited to, the following: free view generation information.

The preceding types of multi-view video coded information may be used in the media offer/answer negotiation, capability exchange, and stream adaptation processes. Moreover, the preceding types of multi-view video coded information may be used for efficient data extraction, transmission, view generation, etc.

Information for Coded Camera Views

A view identifier is unique and is used to distinguish one view from other views. A view identifier is used for the outputting process, view extraction, view random access, and so forth. View coding order keeps track of coded views. A view identifier is incremented by one for each coded view in the coding order. A view identifier is useful to the decoder in detecting lost views.

View scalability information is used to allow for access to selected views with minimal decoding effort. View scalability information enables the video to be displayed on a multitude of different terminals and over a network(s) with varying conditions. View scalability information can be used to detect lost views when a discontinuous view level is detected.

Although it is known that not all views are required for certain view representation, it is not known by default which views are not required. View dependency information can help view extraction, view random access, and so forth. View dependency information can help a decoder access a frame in a given view with a minimal decoding of frames in the view dimension. View dependency information can help a streaming server avoid sending unnecessary views without having to analyze the bitstream to effect such avoidance. For error concealment of a lost view, dependency information can help a decoder decide which view to copy and/or interpolate to conceal the lost view.

Depending on application and available resources, bit rate, frame rate and frame size information could be set differently for different views. The information can be used to derive the picture quality among views, so the application can decide which view to extract for display. In addition, bit rate information can help a decoder manage computation resources for parallel processing. Frame rate and frame size information can be used for view synthesis. The information can also help error detection. If the bit rate or frame rate received for a certain view is lower than what is specified, we know there are errors in this view.

Depending on the application, for some views, only parts of images are coded. Region of interest (ROI) information is useful to support view region of interest. For error concealment purposes, region of interest serves to provide the hint regarding which portion of an image is relevant.

For each view, temporal/spatial/signal-to-noise-ratio (SNR) scalability information provides the flexibility to let a media-aware network element or the receiver know which scalability information that can be discarded for a particular view.

In current multi-view video coding systems, MPEG-4 AVC Standard compatible views and non-compatible views use different sequence parameter sets, which means a view representation may not use all the initial parameters sets of the entire stream. Thus, transmitting all the initial parameters sets may cause a waste of transmission bandwidth and a longer initial setup delay, particularly because initial parameter sets are typically transmitted out-of-band and reliably, which implies that reception acknowledgement is used and retransmission may be used. Signaling of initial parameter sets for each view representation solves the problem.

Camera parameters are helpful for view generation, view interpolation, view synthesis, and so forth. View generation, view interpolation, and view synthesis not only serve coding purposes, but can also be used for error concealment at the decoder.

An embodiment of a supplemental enhancement information message which supports the above described coded camera view information is illustrated in TABLE 1.

TABLE 1

| coded_camera_view_info( payloadSize ) { | C | Descriptor |
|---|---|---|
|   num_coded_views_minus1 | 5 | ue(v) |
|   for( i = 0; i <= num_coded_views_minus1; i++ ) { | | |
|     view_id[ i ] | 5 | ue(v) |
|     view_num[ i ] | 5 | ue(v) |
|     view_level[ i ] | 5 | u(3) |
|     view_dependency_info_present_flag[ i ] | 5 | u(3) |
|     bitrate_info_present_flag[ i ] | 5 | u(1) |
|     frm_rate_info_present_flag[ i ] | 5 | u(1) |
|     frm_size_info_present_flag[ i ] | 5 | u(1) |
|     sub_region_flag[ i ] | 5 | u(1) |
|     scalability_info_presentation_flag[i] | 5 | u(1) |
|     profile_level_info_present_flag[ i ] | 5 | u(1) |
|     init_parameter_sets_info_present_flag[ i ] | 5 | u(1) |
|     camera_parameters_info_presentation_flag[i] | 5 | u(1) |
|     if (profile_level_info_present_flag[ i ]) { | | |
|       view_profile_idc[ i ] | 5 | u(8) |
|       view_constraint_set0_flag[ i ] | 5 | u(1) |
|       view_constraint_set1_flag[ i ] | 5 | u(1) |
|       view_constraint_set2_flag[ i ] | 5 | u(1) |
|       view_constraint_set3_flag[ i ] | 5 | u(1) |
|       reserved_zero_4bits /* equal to 0 */ | 5 | u(4) |
|       view_level_idc[ i ] | 5 | u(8) |
|     } else | | |
|       profile_level_info_src_view_id_delta[i] | 5 | se(v) |
|     if( bitrate_info_present_flag[ i ] ) { | | |
|       avg_bitrate[ i ] | 5 | u(16) |
|       max_bitrate_view[ i ] | 5 | u(16) |
|       max_bitrate_decoded_picture[ i ] | 5 | u(16) |
|       max_bitrate_calc_window[ i ] | 5 | u(16) |
|     } | | |
|     if( frm_rate_info_present_flag[ i ] ) { | | |
|       constant_frm_rate_idc[ i ] | 5 | u(2) |
|       avg_frm_rate[ i ] | 5 | u(16) |
|     } else | | |
|       frm_rate_info_src_view_id_delta | 5 | se(v) |
|     if( frm_size_info_present_flag[ i ] ) { | | |
|       frm_width_in_mbs_minus1[ i ] | 5 | ue(v) |
|       frm_height_in_mbs_minus1[ i ] | 5 | ue(v) |
|     } else | | |
|       frm_size_info_src_view_id_delta[ i ] | 5 | ue(v) |
|     if( sub_region_view_flag[ I ] ) { | | |
|       horizontal_offset[ i ] | 5 | u(16) |
|       vertical_offset[ i ] | 5 | u(16) |
|       region_width[ i ] | 5 | u(16) |
|       region_height[ i ] | 5 | u(16) |
|     } else | | |
|       sub_region_info_src_view_id_delta[ i ] | 5 | ue(v) |
|     if(view_dependency_info_present_flag[ i ] ) { | | |

TABLE 1-continued

| coded_camera_view_info( payloadSize ) { | C | Descriptor |
|---|---|---|
|       num_directly_dependent_views_anchor[ i ] | 5 | ue(v) |
|       num_directly_dependent_views_non_anchor[ i ] | 5 | ue(v) |
|       for( j = 0; j < num_directly_dependent_views_anchor[ i ]; j++ ) | | |
|           directly_dependent_view_id_delta_anchor [ i ][ j ] | 5 | se(v) |
|       for( j = 0; j < num_directly_dependent_views_non_anchor[ i ]; j++ ) | | |
|           directly_dependent_view_id_delta_non_anchor [ i ][ j ] | 5 | se(v) |
|   } else | | |
|       view_dependency_info_src_view_id_delta[ i ] | 5 | se(v) |
|   if( init_parameter_sets_info_present_flag[ i ] ) { | | |
|       num_init_seq_parameter_set_minus1[ i ] | 5 | ue(v) |
|       for( j = 0; j <= num_seq_parameter_set_minus1[ i ]; j++ ) | | |
|           init_seq_parameter_set_id_delta[ i ][ j ] | 5 | ue(v) |
|       num_init_pic_parameter_set_minus1[ i ] | 5 | ue(v) |
|       for( j = 0; j <= num_pic_parameter_set_minus1[ i ]; j++ ) | | |
|           init_pic_parameter_set_id_delta[ i ][ j ] | 5 | ue(v) |
|   } else | | |
|       init_parameter_sets_info_src_view_id_delta[ i ] | 5 | se(v) |
|   if (scalable_info_present_flag[i]) { | | |
|       scalable_info(payloadSize) | | |
|   } else | | |
|       scalable_info_src_view_id_delta[ i ] | 5 | se(v) |
|   if (camera_parameter_info_present_flag[ i ] ) { | | |
|       camera_parameters_1_1[i] | 5 | f(32) |
|       *** | | |
|       camera_parameters_3_4[i] | 5 | f(32) |
|   } else | | |
|     camera_parameter_info_src_view_id_delta[ i ] | 5 | se(v) |
|   } | | |
| } | | |

The syntax of the supplemental enhancement information message for the coded camera view information is indicated in bold in TABLE 1 and the semantics are described as follows. It is to be noted that the initial parameter sets referred to in the syntax and/or semantics refer to those parameter sets that can be placed in the beginning of the bitstream or that can be transmitted in the beginning of a session.

num_coded_views_minus1 plus 1 indicates the number of coded views supported by the bitstream. The value of num_coded_views_minus1 is in the range of 0 to 1023, inclusive.

view_id[i] indicates the identifier of the ith view.

view_num[i] indicates the view coding order for the view with a view identifier equal to view_id[i]. view_num is incremented by one for each coded view in the coding order.

view_level[i] indicates a level of view scalability for the view with a view identifier equal to view_id[i].

view_dependency_info_present_flag[i] equal to 1 indicates the presence of view dependency information for the view with a view identifier equal to view_id[i] in the supplemental enhancement information message. A value of 0 indicates that the view dependency information for the view is the same as another view indicated by view_dependency_info_src_view_id_delta[i] (when view_dependency_info_src_view_id_delta[i] is not equal to 0) or that the view dependency information for the view is not present in the supplemental enhancement information message (when view_dependency_info_src_view_id_delta[i] is equal to 0).

bitrate_info_present_flag[i] equal to 1 indicates the presence of bitrate information for the view with a view identifier equal to view_id[i] in the supplemental enhancement information message. A value of 0 indicates that the bitrate information for the view with a view identifier equal to view_id[i] is not present in the supplemental enhancement information message.

frm_rate_info_present_flag[i] equal to 1 indicates the presence of frame rate information for the view with a view identifier equal to view_id[i] in the supplemental enhancement information message. A value of 0 indicates that the frame rate information for the view is the same as another view indicated by frm_rate_info_src_view_id_delta[i] (when frm_rate_info_src_view_id_delta[i] is not equal to 0) or that the frame rate information for the view is not present in the supplemental enhancement information message (when frm_rate_info_src_view_id_delta[i] is equal to 0).

frm_size_info_present_flag[i] equal to 1 indicates the presence of frame size information for the view with a view identifier equal to view_id[i] in the supplemental enhancement information message. A value of 0 indicates that the frame size information for the view is the same as another view indicated by frm_size_info_src_view_id_delta_minus1[i].

sub_region_view_flag[i] equal to 1 indicates that sub-region information for the view with a view identifier equal to view_id[i] is present in the supplemental enhancement information message. A value of 0 indicates that sub-region information for the view is the same as another view indicated by sub_region_info_src_view_id_delta[i] (when sub_region_info_src_view_id_delta[i] is not equal to 0) or that the sub-region information for the view is not present in the supplemental enhancement information message (when sub_region_info_src_view_id_delta[i] is equal to 0).

scalability_info_present_flag[i] equal to 1 indicates the presence of scalability information for the view with a view identifier equal to view_id[i ] in the supplemental enhancement information message. A value of 0 indicates that the view dependency information for the view is the same as another view indicated by view_dependency_info_src_view_id_delta[i] (when scalable_info_src_view_id_delta[i] is not equal 0) or that the scalability information for the view is not present in the supplemental enhancement information message (when scalable_info_src_view_id_delta[i] is equal to 0). A value of 1 indicates the use of the scalable_info ( ) supplemental enhancement information message in the scalable video coding (SVC) extension of the MPEG-4 AVC Standard.

profile_level_info_present_flag[i] equal to 1 indicates the presence of profile and level information for the view with a view identifier equal to view_id[i] in the supplemental enhancement information message. A value of 0 indicates that the profile and level information for the view with a view identifier equal to view_id[i] is the same as another view indicated by profile_level_info_src_view_id_delta[i] (when profile_level_info_src_view_id_delta[i] is not equal 0) or that the profile and level information for the view is not present in the supplemental enhancement information message (when profile_level_info_src_view_id_delta[i] is equal to 0).

init_parameter_sets_info_present_flag[i] equal to 1 indicates the presence of the initial parameter sets information for the view with a view identifier equal to view_id[i] in the supplemental enhancement information message. A value of 0 indicates that the initial parameter sets information for the view is the same as another view indicated by init_parameter_set_info_src_view_id_delta[i] (when init_parameter_set_info_src_view_id_delta[i] is not equal 0) or that the initial parameter sets information for the view is not present in the supplemental enhancement information message (when init_parameter_set_info_src_view_id_delta[i] is equal to 0).

camera_parameters_info_present_flag[i] equal to 1 indicates the presence of camera parameter information for the view with a view identifier equal to view_id[i] in the supplemental enhancement information message. A value of 0 indicates that the camera parameter information for the view is the same as another view indicated by camera_parameter_info_src_view_id_delta[i] (when camera_parameter_info_src_view_id_delta[i] is not equal0) or that the camera parameter information for the view is not present in the supplemental enhancement information message (when camera_parameter_info_src_view_id_delta[i] is equal to 0).

view_profile_idc[i], view_constraint_set0_flag[i], view_constraint_set1_flag[i], view_constraint_set2_flag[i], view_constraint_set3_flag[i], and view_level_idc[i] indicate the profile and level compliancy of the bitstream of the representation of the view with a view identifier equal to view_id[i]. The semantics of view_profile_idc[i], view_constraint_set0_flag[i], view_constraint_set1_flag[i], view_constraint_set2_flag[i], view_constraint_set3_flag[i], and view_level_idc[i] are identical to the semantics of profile_idc, constraint_set0_flag, constraint_set1_flag, constraint_set2_flag, constraint_set3_flag, and level_idc, respectively, with the bitstream in question being the one of this view representation.

profile_level_info_src_view_id_delta[i] greater than 0 specifies that the view with a view identifier equal to view_id[i] has the same profile and level information as the view with view identifier equal to (view_id[i]+profile_level_info_src_view_id_delta[i]). A value of 0 indicates that the profile and level information for the view with view identifier equal to view_id[i] is not present in the supplemental enhancement information message.

avg_bitrate[i] indicates the average bit rate, in units of 1000 bits per second, of the bitstream of the representation of the view with a view identifier equal to view_id[i]. The semantics of avg_bitrate[i] is identical to the semantics of average_bit_rate in the sub-sequence view characteristics supplemental enhancement information message when accurate_statistics_flag is equal to 1, except that herein the target bitstream is the bitstream of the view representation.

max_bitrate_view[i] indicates the maximum bit rate, in units of 1000 bits per second, of the bitstream of the view with a view identifier equal to view_id[i], calculated based on a time window specified by max_bitrate_calc_window[i].

max_bitrate_decoded_picture[i] indicates the maximum bit rate, in units of 1000 bits per second, of the bitstream of the representation of the view with a view identifier equal to view_id[i], calculated based on a time window specified by max_bitrate_calc_window[i].

max_bitrate_calc_window[i] indicates the length of the time window, in units of 1/100 second, based on which max_bitrate1[i] and max_bitrate2[i] are calculated.

constant_frm_rate_idc[i] indicates whether the frame rate of the representation of the view with a view identifier equal to view_id[i] is constant. If the value of avg_frm_rate as specified herein below is constant, irrespective of which temporal section of the view representation is used for the calculation, then the frame rate is constant, otherwise the frame rate is non-constant. A value of 0 denotes a non-constant frame rate, a value of 1 denotes a constant frame rate, and a value of 2 denotes that it is not clear whether the frame rate is constant. The value of constantFrameRate is in the range of 0 to 2, inclusive.

avg_frm_rate[i] indicates the average frame rate, in units of frames per second, of the bitstream of the representation of the view with a view identifier equal to view_id[i]. The semantics of avg_frm_rate[i] are identical to the semantics of average_frame_rate in the sub-sequence view characteristics supplemental enhancement information message when accurate_statistics_flag is equal to 1, except that herein the target bitstream is the bitstream of the view representation.

frm_rate_info_src_view_id_delta greater than 0 indicates that the view with a view identifier equal to view_id[i] has the same frame rate information as the view with a view identifier equal to (view_id[i]−frm_rate_info_src_view_id_delta[i]. A value of 0 indicates that the frame rate information of the view with a view identifier equal to view_id[i] is not present in the supplemental enhancement information message.

frm_width_in_mbs_minus1[i] plus 1 indicates the maximum width, in macroblocks, of a coded frame in the representation of the view with view identifier equal view_id[i]. The variable PicWidthInMbs[i] is derived as (frm_width_in_mbs_minus1[i]+1).

frm_height_in_mbs_minus1[i] plus 1 indicates the maximum height, in macroblocks, of a coded frame in the representation of the view with a view identifier equal view_id[i]. The variable PicHeightInMbs[i] is derived as (frm_height_in_mbs_minus1[i]+1). The variable PicSizeInMbs[i] indicates the picture size in units of macroblocks and is derived as PicWidthInMbs[i]*PicHeightInMbs[i].

frm_size_info_src_view_id_delta[i] specifies that the view with a view identifier equal to view_id[i] has the same frame size information as the view with a view identifier equal to (view_id[i]+frm_size_info_src_view_id_delta[i]). A value of 0 indicates that the frame size information of the view with a view identifier equal to view_id[i] is not present in the supplemental enhancement information message.

horizontal_offset[i] and vertical_offset[i] give the horizontal and vertical offsets, respectively, of the top-left pixel of the rectangular region represented by the representation of the view with a view identifier equal to view_id[i].

region_width[i] and region_height[i] indicate the width and height, respectively, of the rectangular region represented by the representation of the view with a view identifier equal to view_id[i].

sub_region_info_src_view_id_delta[i] indicates that the view with a view identifier equal to view_id[i] has the same sub-region information as the view with a view identifier equal to (view_id[i]+sub_region_info_src_view_id_delta [i]). A value of 0 indicates that the sub-region information of the view with a view identifier equal to view_id[i] is not present in the supplemental enhancement information message.

num_directly_dependent_views_anchor[i] indicates the number of views that the anchor pictures of the view with a view identifier equal to view_id[i] are directly dependent on. The value of num_directly_dependent_views_anchor is in the range of 0 to 15, inclusive.

num_directly_dependent_views_non_anchor[i] indicates the number of views that the non-anchor pictures of view with view identifier equal to view_id[i] is directly dependent on. The non-anchor pictures of view A are directly dependent on non-anchor pictures of view B if there is at least one coded non-anchor picture in view A using inter-view prediction from a non-anchor picture from view B. The value of num_directly_dependent_views_non_anchor is in the scope of 0 to 15, inclusive.

directly_dependent_view_id_delta_anchor[i][j] indicates the difference between the view_id[i] and a view identifier of the $j^{th}$ view that the anchor picture of the view with a view identifier equal to view_id[i] is directly dependent on. The view identifier of the directly dependent view is equal to (view_id[i]+directly_dependent_layer_id_delta_anchor [i][j]).

directly_dependent_view_Id_delta_non_anchor[i][j] indicates the difference between the view_id[i] and a view identifier of the $j^{th}$ view that the non-anchor picture of the view with a view identifier equal to view_id[i] is directly dependent on. The view identifier of the directly dependent view is equal to (view_id[i]+directly_dependent_layer_id_delta_non_anchor[i][j]).

num_init_seq_parameter_set_minus1[i] plus 1 indicates the number of initial sequence parameter sets for decoding the representation of the view with a view identifier equal to view_id[i].

init_seq_parameter_set_id_delta[i][j] indicates the value of the seq_parameter_set_id of the $j^{th}$ initial sequence parameter set for decoding the representation of the view with a view identifier equal to view_id[i] if j is equal to 0. If j is larger than 0, init_seq_parameter_set_id_delta[i][j] indicates the difference between the value of the seq_parameter_set_id of the $j^{th}$ initial sequence parameter set and the value of the seq_parameter_set_id of the $(j-1)^{th}$ initial sequence parameter set. The initial sequence parameter sets are logically ordered in ascending order of the value of seq_parameter_set_id.

num_init_pic_parameter_set_minus1[i] plus 1 indicates the number of initial picture parameter sets for decoding the representation of the view with a view identifier equal to view_id[i].

init_pic_parameter_set_id_delta[i][j] indicates the value of the pic_parameter_set_id of the $j^{th}$ initial picture parameter set for decoding the representation of the view with a view identifier equal to view_id[i] if j is equal to 0. If j is larger than 0, init_pic_parameter_set_id_delta[i][j] indicates the difference between the value of the pic_parameter_set_id of the $j^{th}$ initial picture parameter set and the value of the pic_parameter_set_id of the $(j-1)^{th}$ initial picture parameter set. The initial picture parameter sets are logically ordered in ascending order of the value of pic_parameter_set_id.

init_parameter_sets_info_src_view_id_delta[i] specifies that the view with a view identifier equal to view_id[i] has the same initial parameter sets information as the view with a view identifier equal to (view_id[i]+init_parameter_sets_info_src_view_id_delta[i]). A value of 0 indicates that the initial parameter sets information of the view with a view identifier equal to view_id[i] is not present in the supplemental enhancement information message.

camera_parameter_info_src_view_id_delta[i] specifies that the view with a view identifier equal to view_id[i] has the same camera parameter information as the view with a view identifier equal to (view_id[i]+camera_parameter_info_src_view_id_delta[i]). A value of 0 indicates that the camera parameter information of the view with a view identifier equal to view_id[i] is not present in the supplemental enhancement information message.

Information for Non-Coded Camera Views

A view identifier is used to indicate to the decoder which view is not coded. A view identifier can help the decoder determine that a missing view is lost due to a network error(s) or due to being intentionally not coded.

View interpolation information is helpful to a decoder in interpolating the non-coded views from coded views. View interpolation information can include information such as, for example, which views are used for interpolation, which interpolation method should be used, and so forth. Thus, if the application requests the display of only certain non-coded views, then the server only needs to extract and send the required views for interpolation, and their dependent views based on view dependency information of the coded views.

Camera parameters can be used for interpolating or synthesizing the non-coded views.

An embodiment of a supplemental enhancement information message which supports the above described non-coded camera view information is illustrated in TABLE 2.

TABLE 2

| coded_camera_view_info( payloadSize ) { | C | Descriptor |
|---|---|---|
|   num_non_coded_views_minus1 | 5 | ue(v) |
|   for( i = 0; i <= num_coded_views_minus1; i++ ) { | | |
|     view_id[ i ] | 5 | ue(v) |
|     view_interpolation_info_present_flag[ i ] | 5 | u(3) |
|     camera_parameters_info_presentation_flag[ i ] | 5 | u(1) |
|     if(view_interpolation_info_present_flag[ i ] ) { | | |
|       num_referenced_views[ i ] | 5 | ue(v) |
|       for( j = 0; j < num_directly_dependent_views[ i ]; j++ ) | | |
|         referenced_view_id_delta [ i ][ j ] | 5 | se(v) |
|     } else | | |

TABLE 2-continued

| coded_camera_view_info( payloadSize ) { | C | Descriptor |
|---|---|---|
|    view_interpolation_info_src_view_id_delta[ i ] | 5 | se(v) |
|   if (camera_parameter_info_present_flag[ i ] ) { | | |
|    camera_parameters_1_1[i] | 5 | f(32) |
|    \*\*\* | | |
|    camera_parameters_3_4[i] | 5 | f(32) |
|   } else | | |
|    camera_parameter_info_src_view_id_delta[ i ] | | |
|  } | | |
| } | | |

The syntax of the supplemental enhancement information message for the non-coded camera view information is indicated in bold in TABLE 2 and the semantics are described as follows. It is to be noted that the initial parameter sets referred to in the syntax and/or semantics refer to those parameter sets that can be placed in the beginning of the bitstream or that can be transmitted in the beginning of a session.

num_non_coded_views_minus1 plus 1 indicates the number of non-coded views supported by the bitstream. The value of num_non_coded_views_minus1 is in the range of 0 to 1023, inclusive.

view_id[i] indicates the identifier of the ith view.

view_interpolation_info_present_flag[i] equal to 1 indicates the presence of view interpolation information for the view with a view identifier equal to view_id[i] in the supplemental enhancement information message. A value of 0 indicates that the view interpolation information for the view is the same as another view indicated by view_interpolation_info_src_view_id_delta[i] (when view_interpolation_info_src_view_id_delta[i] is not equal 0) or that the view dependency information for the view is not present in the supplemental enhancement information message (when view_interpolation_info_src_view_id_delta[i] is equal to 0).

camera_parameters_info_present_flag[i] equal to 1 indicates the presence of camera parameter information for the view with a view identifier equal to view_id[i] in the supplemental enhancement information message. A value of 0 indicates that the camera parameter information for the view is the same as another view indicated by camera_parameter_info_src_view_id_delta[i] (when camera_parameter_info_src_view_id_delta[i] is not equal 0) or that the camera parameter information for the view is not present in the supplemental enhancement information message (when camera_parameter_info_src_view_id_delta[i] is equal to 0).

camera_parameters: it is presumed that camera parameters are conveyed in the form of a 3×4 projection matrix P, which can be used to map a point in the 3D world to the 2D image coordinate:

$$I = P * [X_w; Y_w; Z_w; 1]$$

where I is in homogeneous coordinates $I = [\lambda \cdot I_x; \lambda \cdot I_y; \lambda]$. Each element camera_parameters_\*_\* can be represented according to the Institute of Electrical and Electronics Engineers (IEEE) single precision floating point (32 bits) standard.

num_referenced_views[i] indicates the number of views that the view with a view identifier equal to view_id[i] is interpolated from. The value of num_directly_dependent_views is in the range of 0 to 1023, inclusive.

directly_dependent_view_id_delta[i][j] indicates the difference between view_id[i] and a view identifier of the $j^{th}$ view that the view with a view identifier equal to view_id[i] is interpolated from. The view identifier of such a view is equal to (view_id[i]+directly_dependent_layer_id_delta[i][j]).

camera_parameter_info_src_view_id_delta[j] specifies that the view with a view identifier equal to view_id[i] has the same camera parameter information as the view with a view identifier equal to (view_id[i]+camera_parameter_info_src_view_id_delta[i]). A value of 0 indicates that the camera parameter information of the view with view identifier equal to view_id[i] is not present in the supplemental enhancement information message.

Information for Free Viewpoint Applications

Free viewpoint video offers the same functionality that is known from three-dimensional (3D) computer graphics. The user can choose a particular viewpoint and viewing direction within a visual scene, thus providing interactive free viewpoint navigation. This feature is of interest for many user applications, such as, for example, a DVD of an opera/concert/sporting event where the user can freely chose the viewpoint.

In order to better support free viewpoint applications, a multi-view information supplemental enhancement information message may be used to convey information specific to free viewpoint including, but not limited to, the following:

One example of free viewpoint information is the type of camera array setting such as, for example, a linear array, dome array, and/or two-dimensional (2D) rectangular array.

Another example of free viewpoint information is the definition of navigation space, including the extent to which a user is allowed to change the viewpoint and/or viewing direction. Depending on the capability of the rendering device, navigation space could be defined as a one-dimensional or a multi-dimensional space. In the case of a two-dimensional space, the coordinate system could be defined as the dimensions of horizontal/vertical viewpoint or pan/tilt viewing direction.

Yet another example of free viewpoint information is the set of views needed for rendering for a given position in the navigation space. For example, if the rendering device is constrained to be able to navigate along a one-dimensional baseline, then the set of dependent views for each segment of that baseline should be specified. This information, if available, will help a decoder that is able to decode multi-view video content to decide the subset of view images needed to be decoded in order to render a given position in the navigation space.

An embodiment of a supplemental enhancement information message which supports the above described free viewpoint information is illustrated in TABLE 3.

TABLE 3

| free_viewpoint_info ( ) { | C | Descriptor |
|---|---|---|
|     camera_array_type | 5 | ue(v) |
|     if (camera_array_type == 1 ) { | | |
|         left_bound_for_navigation | 5 | u(10) |
|         right_bound_for_navigation | 5 | u(10) |
|         num_segments_in_navigation_space | 5 | ue(v) |
|         for (i=0; i< num_segments_in_navigation_space; i++) { | | |
|             left_bound_segment | 5 | u(10) |
|             num_views_needed_for_rendering | 5 | ue(v) |
|             for (i=0; i< num_segments_in_navigation_space; i++) { | | |
|                 view_id_needed_for_rendering[i][j] | 5 | ue(v) |
|             } | | |
|         } | | |
|     } else { | | |
|         ... | | |
|     } | | |
| } | | |

The syntax of the supplemental enhancement information message for the free viewpoint information is indicated in bold in TABLE 3 and the semantics are described as follows. It is to be noted that the initial parameter sets referred to in the syntax and/or semantics refer to those parameter sets that can be placed in the beginning of the bitstream or that can be transmitted in the beginning of a session.

camera_array_type indicates the type of camera array.

left_bound_for_navigation indicates the left bound of the navigation space.

right_bound_for_navigation indicates the left bound of the navigation space.

num_segments_in_navigation_space indicates the number of segments in the navigation space that have a different set of views needed for rendering.

left_bound_segment indicates the left bound of the current segment in the navigation space.

num_views_needed_for_rendering indicates the number of views needed for rendering when navigating within the current segment.

view_id_needed_for_rendering[i][j] indicates the view_id of the j-th view that is needed for rendering when navigating in the i-th segment in the navigation space.

Turning to FIGS. 3A-3D, an exemplary method for encoding multi-view information is indicated generally by the reference numeral 300. It is to be appreciated that the method 300 includes a method 500 for encoding multi-view information that includes non-coded camera view information and a method 600 for encoding multi-view information that includes free viewpoint information. Moreover, it is to be appreciated that the method 300 also encodes multi-view information that includes coded camera view information.

The method 300 includes a start block 302 that passes control to a function block 304. The function block 304 reads an encoder configuration file, and passes control to a function block 306. The function block 306 sets up the encoding parameters, and passes control to a function block 308. The function block 308 creates a high level syntax (e.g., sequence parameter set (SPS), picture parameter set (PPS), and/or view parameter set), and passes control to a function block 310. The function block 310 starts creating a coded camera view information supplemental enhancement information (SEI) message, and passes control to a function block 312. The function block 312 sets the number of coded views, and passes control to a decision block 314. The decision block 314 determines whether or not the number of coded views is set for all views. If so, then control is passed to a function block 316. Otherwise, control is passed to a function block 320.

The function block 316 writes a supplemental enhancement information (SEI) message to a bitstream, and passes control to a function block 317. The function block 317 sends the supplemental enhancement information (SEI) message in band or out of band, and passes control to a function block 318. The function block 318 encodes the views, and passes control to an end block 399.

The function block 320 sets the view_id syntax parameter, and passes control to a function block 322. The function block 322 sets the view_num syntax element, and passes control to a function block 324. The function block 324 sets the view_level syntax parameter, and passes control to a function block 326 The function block 326 sets the view dependency present flag, and passes control to a function block 328. The function block 328 sets the bit rate information present flag, and passes control to a function block 330. The function block 330 sets the frame rate information present flag, and passes control to a function block 332. The function block 332 sets the frame size information present flag, and passes control to a function block 334. The function block 334 sets the sub-region flag, and passes control to a function block 336. The function block 336 sets the scalability information present flag, and passes control to a function block 338. The function block 338 sets the profile/level flag, and passes control to a function block 340. The function block 340 sets the initial parameter sets flag, and passes control to a function block 342. The function block 342 sets the camera parameter present flag, and passes control to a decision block 344. The decision block 344 determines whether or not the profile/level information present flag is set. If so, then control is passed to a function block 346. Otherwise, control is passed to a function block 348.

The function block 346 sets the profile/level constraint flags, sets the view_level flag, and passes control to a decision block 350. The decision block 350 determines whether or not the bitrate information present flag is set. If so, the control is passed to a function block 352. Otherwise, control is passed to a decision block 354.

The function block 352 sets the bit rate related information, and passes control to the decision block 354.

The decision block 354 determines whether or not the frame information present flag is set. If so, then control is passed to a function block 356. Otherwise, control is passed to a function block 358.

The function block 356 sets the frame rate related information, and passes control to a decision block 360.

The decision block 360 determines whether or not the frame size information present flag is set. If so, the control is passed to a function block 362. Otherwise, control is passed to a function block 364.

The function block 362 sets the frame size information, and passes control to a decision block 366.

The decision block 366 determines whether or not the sub-region information present flag is set. If so, then control is passed to a function block 368. Otherwise, control is passed to a function block 370.

The function block 368 sets the sub-region information, and passes control to an on-or-off page connector 395.

The on-or-off page connector 395 passes control to a decision block 402. The decision block 402 determines whether or not the view dependency information present flag is set. If so, the control is passed to a function block 404. Otherwise, control is passed to a function block 406.

The function block 404 sets the view dependency information parameters, and passes control to a decision block 408. The decision block 408 determines whether or not the parameter sets initial information present flag is set. If so, the control is passed to a function block 410. Otherwise, control is passed to a function block 412.

The function block 410 sets the parameter sets initial information parameters, and passes control to a decision block 414. The decision block 414 determines whether or not the free viewpoint information present flag is set. If so, then control is passed to a function block 416. Otherwise, control is passed to a function block 418.

The function block 416 sets the free viewpoint information parameters, and passes control to a decision block 420. The decision block 420 determines whether or not the scalable information present flag is set. If so, then control is passed to a function block 422. Otherwise, control is passed to a function block 424.

The function block 422 sets the scalable information parameters, and passes control to a decision block 426. The decision block 426 determines whether or not the camera information present flag is set. If so, then control is passed to a function block 428. Otherwise, control is passed to a function block 430.

The function block 428 sets the camera information parameters, and passes control to an on-or-off page connector 397. The on-or-off page connector 397 returns control to the decision block 314.

The function block 348 sets the source view_id delta values, and passes control to the decision block 348.

The function block 358 sets the source view_id delta value, and passes control to the decision block 360.

The function block 364 sets the source view_id delta value, and passes control to the decision block 366.

The function block 370 sets the source view-id delta value, and passes control to the on-or-off page connector 395.

The function block 406 sets the source view-id delta value, and passes control to the decision block 408.

The function block 412 sets the source view-id delta value, and passes control to the decision block 414.

The function block 418 sets the source view-id delta value, and passes control to the decision block 420.

The function block 424 sets the source view-id delta value, and passes control to the decision block 426.

The function block 430 sets the source view-id delta value, and passes control to the on-or-off page connector 397.

The method 500 includes a start block 502 that passes control to a function block 504. The function block 504 sets the number of coded views, and passes control to a decision block 506. The decision block 506 determines whether or not any flags are set for all non-coded views. If so, then control is passed to the on-or-off page connector 397. Otherwise, control is passed to a function block 508.

The function block 508 sets the view_id syntax parameter for the non-coded views, and passes control to a function block 510. The function block 510 sets the view interpolation information present flag for the non-coded views, and passes control to the function block 512. The function block 512 sets the camera parameters information present flag for the non-coded views, and passes control to a decision block 514. The decision block 514 determines whether or not the view interpolation flag is set. If so, then control is passed to a function block 516. Otherwise, control is passed to a function block 518.

The function block 516 sets the view interpolation information, and passes control to a decision block 520. The decision block 520 determines whether or not the camera parameters present flag is set. If so, then control is passed to a function block 522. Otherwise, control is passed to a function block 524.

The function block 522 sets the camera parameters information, and returns control to the decision block 506.

The function block 518 sets the source view_id delta value, and passes control to the decision block 520.

The function block 524 sets the source view_id delta value, and returns control to the decision block 506.

The method 600 includes a start block 602 that passes control to a function block 604. The function block 604 sets the camera array type, and passes control to a decision block 606. The decision block 606 determines whether or not the camera array type is equal to one. If so, the control is passed to the on-or-off page connector 393. Otherwise, control is passed to a function block 608. The function block 608 sets the left bound for navigation, and passes control to a function block 610. The function block 610 sets the right bound for navigation, and passes control to a function block 612. The function block 612 sets the number of segments in navigation space, and passes control to a decision block 614. The decision block 614 determines whether or not all segments are done (i.e., boundaries and number of segments set). If so, the control is passed to the on-or-off page connector 393. Otherwise, control is passed to a function block 616. The function block 616 sets the left bound segment, and passes control to a function block 618. The function block 618 sets the number of views needed for rendering, and passes control to a decision block 620. The decision block 620 determines whether all views are done. If so, then control is returned to the decision block 614. Otherwise, control is passed to a function block 622. The function block 622 sets the view_id syntax parameter as needed.

Turning to FIGS. 4A-4D, an exemplary method for decoding multi-view information is indicated generally by the reference numeral 700. It is to be appreciated that the method 700 includes a method 900 for encoding multi-view information that includes non-coded camera view information and a method 1000 for encoding multi-view information that includes free viewpoint information. Moreover, it is to be appreciated that the method 700 also encodes multi-view information that includes coded camera view information.

Thee method 700 includes a start block 702 that passes control to a function block 704. The function block 704 receives the sequence parameter set (SPS), picture parameter set (PPS), and/or view parameter set (VPS) messages in band or out of band, and passes control to a function block 706. The function block 706 reads the high level syntax (sequence parameter set (SPS), picture parameter set (PPS), and/or view parameter set (VPS)), and passes control to a function block 708. The function block 708 starts parsing the coded camera supplemental enhancement information message, and passes control to a function block 710. The function block 710 reads/ parses the number of coded views, and passes control to decision block 714. The decision block 714 determines whether all views have been read/parsed. If so, then control is passed to a function block 716. Otherwise, control is passed to a function block 720.

The function block 716 stores the supplemental enhancement information (SEI) message to memory, and passes control to a function block 718. The function block 718 decodes the views, and passes control to an end block 799.

The function block 720 reads/parses the view_id syntax element, and passes control to a function block 722. The function block 722 reads/parses the view_num syntax element, and passes control to a function block 724. The function block 724 reads/parses the view_level syntax element, and passes control to a function block 726. The function block 726 reads/parses the view dependency present flag, and passes control to a function block 728. The function block 728 reads/parses the bitrate information present flag, and passes control to a function block 730. The function block 730 reads/parses the frame rate information present flag, and passes control to a function block 732. The function block 732 reads/parses the frame size information present flag, and passes control to a function block 734. The function block 734 reads/parses the sub-region flag, and passes control to a function block 736. The function block 736 reads/parses the scalability information present flag, and passes control to a function block 738. The function block 738 reads/parses the profile/level flag, and passes control to a function block 740. The function block 740 reads/parses the initial parameter sets flag, and passes control to a function block 742. The function block 742 reads/parses the camera parameter present flag, and passes control to a decision block 744. The decision block 744 determines whether or not profile/level information present flag has been read/parsed. If so, then control is passed to a function block 746. Otherwise, control is passed to a function block 748.

The function block 746 reads/parses the profile/level constraint flags, reads/parses the view_level syntax element, and passes control to a decision block 750. The decision block 750 determines whether or not the bitrate information present flag has been read/parsed. If so, the control is passed to a function block 752. Otherwise, control is passed to a decision block 754.

The function block 752 reads/parses bit rate related information, and passes control to the decision block 754.

The decision block 754 determines whether or not the frame information present flag has been read/parsed. If so, the control is passed to a function block 756. Otherwise, control is passed to a function block 758.

The function block 756 reads/parses frame rate related information, and passes control to a decision block 760.

The decision block 760 determines whether or not the frame size information present flag has been read/parsed. If so, the control is passed to a function block 762. Otherwise, control is passed to a function block 764.

The function block 762 reads/parses frame size information, and passes control to a decision block 766. The decision block 766 determines whether or not the sub-region information present flag has been read/parsed. If so, the control is passed to a function block 768. Otherwise, control is passed to a function block 860.

The function block 768 reads/parses the sub-region information, and passes control to an on-or-off page connector 795.

The on-or-off page connector 795 passes control to a decision block 802. The decision block 802 determines whether or not the view dependency information present flag has been set. If so, then control is passed to a function block 804. Otherwise, control is passed to a function block 806.

The function block 804 reads/parses view dependency information parameters, and passes control to a decision block 808. The decision block 808 determines whether or not the parameter sets initial information present flag is set. If so, then control is passed to a function block 810. Otherwise, control is passed to a function block 812.

The function block 810 reads/parses the parameter sets initial information parameters, and passes control to a decision block 814. The decision block 814 determines whether or not the free viewpoint information present flag is set. If so, the control is passed to a function block 816. Otherwise, control is passed to a function block 818.

The function block 816 reads/parses the free viewpoint information parameters, and passes control to a decision block 820. The decision block 820 determines whether or not the scalable information present flag is set. If so, the control is passed to a function block 822. Otherwise, control is passed to a function block 824.

The function block 822 reads/parses the scalable information parameters, and passes control to a decision block 826. The decision block 826 determines whether or not the camera information present flag is set. If so, the control is passed to a function block 828. Otherwise, control is passed to a function block 830.

The function block 828 reads/parses the camera information parameters, and passes control to the on-or-off page connector 797.

The function block 748 reads/parses the source view_id delta value, and passes control to the decision block 750.

The function block 758 reads/parses the source view_id delta value, and passes control to the decision block 760.

The function block 764 reads/parses the source view_id delta value, and passes control to the decision block 766.

The function block 770 reads/parses the source view_id delta value, and passes control to the on-or-off page connector 795.

The function block 806 reads/parses the source view_id delta value, and passes control to the decision block 808.

The function block 812 reads/parses the source view_id delta value, and passes control to the decision block 814.

The function block 818 reads/parses the source view_id delta value, and passes control to the decision block 820.

The function block 824 reads/parses the source view_id delta value, and passes control to the decision block 826.

The function block 830 reads/parses the source view_id delta value, and passes control to the on-or-off page connector 797.

The method 900 includes a start block 902 that passes control to a function block 904. The function block 904 reads/parses the number of non-coded views, and passes control to a decision block 906. The decision block 906 determines whether or not all non-coded views have been read/parsed. If so, then control is passed to the on-or-off page connector 797. Otherwise, control is passed to a function block 908. The function block 908 reads/parses the view_id syntax element, and passes control to a function block 910. The function block 910 reads/parses the view interpolation information present flag, and passes control to a function block 912. The function block 912 reads/parses the camera parameters information present flag, and passes control to a decision block 914. The decision block 914 determines whether or not the view interpolation flag is set. If so, then control is passed to a function block 916. Otherwise, control is passed to a function block 918.

The function block 916 reads/parses the view interpolation information, and passes control to a decision block 920. The decision block 920 determines whether or not the camera parameters present flag is set. If so, then control is passed to a function block 922. Otherwise, control is passed to a function block 924.

The function block 918 reads/parses the source view_id delta value, and passes control to the decision block 920.

The function block 924 reads/parses the source view_id delta value, and returns control to the decision block 906.

The method 1000 includes a start block 1002 that passes control to a function block 1004. The function block 1004 reads/parses the camera array type, and passes control to a decision block 1006. The decision block 1006 determines whether or not the camera array type is equal to one. If so, then control is passed to the on-or-off page connector 793. Otherwise, control is passed to a function block 1008.

The function block 1008 reads/parses the left boundary for navigation, and passes control to a function block 1010. The function block 1010 reads/parses the right bound for navigation and passes control to the function block 1012. The function block 1012 reads/parses the number of segments in the navigation space, and passes control to a decision block 1014. The decision block 1014 determines whether or not all segments are done. If so, the control is passed to the on-or-off page connector 793. Otherwise, control is passed to a function block 1016. The function block 1016 reads/parses the left bound segment, and passes control to the function block 1018. The function block 1018 reads/parses the number of views needed for rendering, and passes control to a decision block 1020. The decision block 1020 determines whether or not the parsing of all views has been completed. If so, then control is returned to the decision block 1014. Otherwise, control is passed to the function block 1022.

The function block 1022 reads/parses the view_id as needed.

A description will now be given of some of the many attendant advantages/features of the present invention, some of which have been mentioned above. For example, one advantage/feature is an apparatus that includes an encoder for encoding multi-view video content in a resultant bitstream and multi-view coding information for the multi-view video content in at least one high level syntax element.

Another advantage/feature is the apparatus having the encoder as described above, wherein the at least one high level syntax element comprises at least one of a slice header, a sequence parameter set, a picture parameter set, a view parameter set, a network abstraction layer unit header, and a supplemental enhancement information message.

Yet another advantage/feature is the apparatus having the encoder as described above, wherein the multi-view coding information includes at least one of coded camera view information, non-coded camera view information, and free viewpoint information.

Still another advantage/feature is the apparatus having the encoder wherein the multi-view coding information includes at least one of coded camera view information, non-coded camera view information, and free viewpoint information as described above, wherein the coded camera view information includes at least one of a number of coded camera views and characteristics of each of the coded camera views, the number of coded camera views being any of one or more of a total number of coded camera views corresponding to the multi-view video content.

Moreover, another advantage/feature is the apparatus having the encoder wherein the coded camera view information includes at least one of a number of coded camera views and characteristics of each of the coded camera views, the number of coded camera views being any of one or more of a total number of coded camera views corresponding to the multi-view video content as described above, wherein the characteristics of each of the coded camera views include at least one of scalability information, view scalability information, view dependency information, region of interest information, a bitrate, a frame size, a frame rate, initial parameter sets, and camera parameters, decoder specifications, bitstream restriction information, a view identifier, and coding order information, wherein the scalability information includes at least one of temporal scalability information, spatial scalability information, and signal-to-noise-ratio scalability information, the decoder specifications are indicated by at least one of profile and level information and profile and level constraint information.

Further, another advantage/feature is the apparatus having the encoder wherein the multi-view coding information includes at least one of coded camera view information, non-coded camera view information, and free viewpoint information as described above, wherein the non-coded camera view information includes at least one of a number of non-coded camera views and characteristics of each of the non-coded camera views, the number of coded camera views being any of one or more of a total number of coded camera views corresponding to the multi-view video content.

Also, another advantage/feature is the apparatus having the encoder wherein the non-coded camera view information includes at least one of a number of non-coded camera views and characteristics of each of the non-coded camera views, the number of coded camera views being any of one or more of a total number of coded camera views corresponding to the multi-view video content, wherein the characteristics of each of the non-coded views includes at least one of a view identifier, view interpolation information, and camera parameters.

Additionally, another advantage/feature is the apparatus having the encoder wherein the multi-view coding information includes at least one of coded camera view information, non-coded camera view information, and free viewpoint information as described above, wherein the free viewpoint information includes at least one of parameters and methods for generating at least one view at a given viewpoint and a viewing angle.

Moreover, another advantage/feature is the apparatus having the encoder wherein the free viewpoint information includes at least one of parameters and methods for generating at least one view at a given viewpoint and a viewing angle as described above, wherein the parameters for generating the at least one view include at least one of camera array settings, a definition of a navigation space, and a set of coded camera views for rendering a specified position in the navigation space.

Further, another advantage/feature is the apparatus having the encoder as described above, wherein the at least one high level syntax element is transmitted at least one of in-band and out-of-band with respect to the bitstream.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles are not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding multi-view video content in a resultant bitstream and multi-view coding information for the multi-view video content in at least one high level syntax element, wherein the at least one high level syntax element is transmitted out-of-band with respect to the bitstream, and wherein the multi-view coding information includes non-coded camera view information, the non-coded camera view information including a number of non-coded actually-captured camera views, the number of non-coded actually-captured camera views being any of one or more of a total number of camera views corresponding to the multi-view video content.

2. The apparatus of claim 1, wherein the at least one high level syntax element comprises at least one of a slice header, a sequence parameter set, a picture parameter set, a view parameter set, a network abstraction layer unit header, and a supplemental enhancement information message.

3. The apparatus of claim 1, wherein the multi-view coding information further includes at least one of coded camera view information and free viewpoint information.

4. The apparatus of claim 3, wherein the coded camera view information includes at least one of a number of coded camera views and characteristics of each of the coded camera views, the number of coded camera views being any of one or more of a total number of camera views corresponding to the multi-view video content.

5. The apparatus of claim 4, wherein the characteristics of each of the coded camera views include at least one of scalability information, view scalability information, view dependency information, region of interest information, a bitrate, a frame size, a frame rate, initial parameter sets, and camera parameters, decoder specifications, bitstream restriction information, a view identifier, and coding order information, wherein the scalability information includes at least one of temporal scalability information, spatial scalability information, and signal-to-noise-ratio scalability information, the decoder specifications are indicated by at least one of profile and level information and profile and level constraint information.

6. The apparatus of claim 1, wherein the non-coded camera view information further includes characteristics of each of the non-coded actually-captured camera views.

7. The apparatus of claim 6, wherein the characteristics of each of the non-coded views includes at least one of a view identifier, view interpolation information, and camera parameters.

8. The apparatus of claim 3, wherein the free viewpoint information includes at least one of parameters and methods for generating at least one view at a given viewpoint and a viewing angle.

9. The apparatus of claim 8, wherein the parameters for generating the at least one view include at least one of camera array settings, a definition of a navigation space, and a set of coded camera views for rendering a specified position in the navigation space.

10. A method, comprising:
encoding multi-view video content in a resultant bitstream and encoding multi-view coding information for the multi-view content in at least one high level syntax element, wherein the at least one high level syntax element is transmitted out-of-band with respect to the bitstream, and wherein the multi-view coding information includes non-coded camera view information, the non-coded camera view information including a number of non-coded actually-captured camera views, the number of non-coded actually-captured camera views being any of one or more of a total number of camera views corresponding to the multi-view video content.

11. The method of claim 10, wherein the at least one high level syntax element comprises at least one of a slice header, a sequence parameter set, a picture parameter set, a view parameter set, a network abstraction layer unit header, and a supplemental enhancement information message.

12. The method of claim 10, wherein the multi-view coding information further includes at least one of coded camera view information and free viewpoint information.

13. The method of claim 12, wherein the coded camera view information includes at least one of a number of coded camera views and characteristics of each of the coded camera views, the number of coded camera views being any of one or more of a total number of camera views corresponding to the multi-view video content.

14. The method of claim 13, wherein the characteristics of each of the coded camera views include at least one of scalability information, view scalability information, view dependency information, region of interest information, a bitrate, a frame size, a frame rate, initial parameter sets, and camera parameters, decoder specifications, bitstream restriction information, a view identifier, and coding order information, wherein the scalability information includes at least one of temporal scalability information, spatial scalability information, and signal-to-noise-ratio scalability information, the decoder specifications are indicated by at least one of profile and level information and profile and level constraint information.

15. The method of claim 10, wherein the non-coded camera view information further includes characteristics of each of the non-coded actually-captured camera views.

16. The method of claim 15, wherein the characteristics of each of the non-coded views includes at least one of a view identifier, view interpolation information, and camera parameters.

17. The method of claim 12, wherein the free viewpoint information includes at least one of parameters and methods for generating at least one view at a given viewpoint and a viewing angle.

18. The method of claim 17, wherein the parameters for generating the at least one view include at least one of camera array settings, a definition of a navigation space, and a set of coded camera views for rendering a specified position in the navigation space.

19. An apparatus, comprising:
a decoder for decoding multi-view video content from a resultant bitstream and multi-view coding information for the multi-view content from at least one high level syntax element, wherein the at least one high level syntax element is received out-of-band with respect to the bitstream, and wherein the multi-view coding information includes non-coded camera view information, the non-coded camera view information including a number of non-coded actually-captured camera views, the number of non-coded actually-captured camera views being any of one or more of a total number of camera views corresponding to the multi-view video content.

20. The apparatus of claim 19, wherein the at least one high level syntax element comprises at least one of a slice header, a sequence parameter set, a picture parameter set, a view parameter set, a network abstraction layer unit header, and a supplemental enhancement information message.

21. The apparatus of claim 19, wherein the multi-view coding information further includes at least one of coded camera view information and free viewpoint information.

22. The apparatus of claim 21, wherein the coded camera view information includes at least one of a number of coded camera views and characteristics of each of the coded camera views, the number of coded camera views being any of one or more of a total number of camera views corresponding to the multi-view video content.

23. The apparatus of claim 22, wherein the characteristics of each of the coded camera views include at least one of scalability information, view scalability information, view dependency information, region of interest information, a bitrate, a frame size, a frame rate, initial parameter sets, and camera parameters, decoder specifications, bitstream restriction information, a view identifier, and coding order information, wherein the scalability information includes at least one of temporal scalability information, spatial scalability information, and signal-to-noise-ratio scalability information, the decoder specifications are indicated by at least one of profile and level information and profile and level constraint information.

24. The apparatus of claim 19, wherein the non-coded camera view information further includes characteristics of each of the non-coded actually-captured camera views.

25. The apparatus of claim 24, wherein the characteristics of each of the non-coded views includes at least one of a view identifier, view interpolation information, and camera parameters.

26. The apparatus of claim 21, wherein the free viewpoint information includes at least one of parameters and methods for generating at least one view at a given viewpoint and a viewing angle.

27. The apparatus of claim 26, wherein the parameters for generating the at least one view include at least one of camera array settings, a definition of a navigation space, and a set of coded camera views for rendering a specified position in the navigation space.

28. A method, comprising:
decoding multi-view video content from a resultant bitstream and multi-view coding information for the multi-view content from at least one high level syntax element, wherein the at least one high level syntax element is received out-of-band with respect to the bitstream, and wherein the multi-view coding information includes non-coded camera view information, the non-coded camera view information including a number of non-coded actually-captured camera views, the number of non-coded actually-captured camera views being any of one or more of a total number of camera views corresponding to the multi-view video content.

29. The method of claim 28, wherein the at least one high level syntax element comprises at least one of a slice header, a sequence parameter set, a picture parameter set, a view parameter set, a network abstraction layer unit header, and a supplemental enhancement information message.

30. The method of claim 28, wherein the multi-view coding information further includes at least one of coded camera view information and free viewpoint information.

31. The method of claim 30, wherein the coded camera view information includes at least one of a number of coded camera views and characteristics of each of the coded camera views, the number of coded camera views being any of one or more of a total number of camera views corresponding to the multi-view video content.

32. The method of claim 31, wherein the characteristics of each of the coded camera views include at least one of scalability information, view scalability information, view dependency information, region of interest information, a bitrate, a frame size, a frame rate, initial parameter sets, and camera parameters, decoder specifications, bitstream restriction information, a view identifier, and coding order information, wherein the scalability information includes at least one of temporal scalability information, spatial scalability information, and signal-to-noise-ratio scalability information, the decoder specifications are indicated by at least one of profile and level information and profile and level constraint information.

33. The method of claim 28, wherein the non-coded camera view information further includes characteristics of each of the non-coded actually-captured camera views.

34. The method of claim 33, wherein the characteristics of each of the non-coded views includes at least one of a view identifier, view interpolation information, and camera parameters.

35. The method of claim 30, wherein the free viewpoint information includes at least one of parameters and methods for generating at least one view at a given viewpoint and a viewing angle.

36. The method of claim 35, wherein the parameters for generating the at least one view include at least one of camera array settings, a definition of a navigation space, and a set of coded camera views for rendering a specified position in the navigation space.

37. A non-transitory storage media having video signal data encoded thereupon, comprising:
multi-view video content encoded in a resultant bitstream, wherein multi-view coding information for the multi-view content is encoded in at least one high level syntax element, wherein the at least one high level syntax element is transmitted out-of-band with respect to the bitstream, and wherein the multi-view coding information includes non-coded camera view information, the non-coded camera view information including a number of non-coded actually-captured camera views, the number of non-coded actually-captured camera views being any of one or more of a total number of camera views corresponding to the multi-view video content.

* * * * *